(12) United States Patent
Hirakata

(10) Patent No.: US 11,074,025 B2
(45) Date of Patent: Jul. 27, 2021

(54) DISPLAY DEVICE AND METHOD FOR MANUFACTURING THE SAME

(71) Applicant: SEMICONDUCTOR ENERGY LABORATORY CO., LTD., Atsugi (JP)

(72) Inventor: Yoshiharu Hirakata, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 1407 days.

(21) Appl. No.: 13/970,888

(22) Filed: Aug. 20, 2013

(65) Prior Publication Data

US 2014/0063364 A1    Mar. 6, 2014

(30) Foreign Application Priority Data

Sep. 3, 2012    (JP) .............................. JP2012-192826

(51) Int. Cl.
| | |
|---|---|
| *G06F 1/16* | (2006.01) |
| *G06F 3/044* | (2006.01) |
| *G06F 3/041* | (2006.01) |
| *G02F 1/1333* | (2006.01) |
| *G06F 3/14* | (2006.01) |

(52) U.S. Cl.
CPC .......... *G06F 3/1446* (2013.01); *G06F 1/1643* (2013.01); *G06F 1/1692* (2013.01); *G06F 3/0412* (2013.01); *G06F 3/0445* (2019.05); *G06F 2203/04103* (2013.01)

(58) Field of Classification Search
None
See application file for complete search history.

(56) References Cited

U.S. PATENT DOCUMENTS

| | | |
|---|---|---|
| 6,846,696 B2 | 1/2005 | Adachi et al. |
| 6,881,975 B2 | 4/2005 | Anzai et al. |
| 7,030,551 B2 | 4/2006 | Yamazaki et al. |
| 7,037,752 B2 | 5/2006 | Kuwabara et al. |
| 7,045,438 B2 | 5/2006 | Yamazaki et al. |
| 7,067,392 B2 | 6/2006 | Yamazaki et al. |
| 7,067,926 B2 | 6/2006 | Yamazaki et al. |
| 7,084,045 B2 | 8/2006 | Takayama et al. |
| 7,091,070 B2 | 8/2006 | Imai et al. |

(Continued)

FOREIGN PATENT DOCUMENTS

| | | |
|---|---|---|
| CN | 001430192 A | 7/2003 |
| CN | 102053766 A | 5/2011 |

(Continued)

*Primary Examiner* — Edward J Glick
*Assistant Examiner* — Anthony G Quash
(74) *Attorney, Agent, or Firm* — Nixon Peabody LLP; Jeffrey L. Costellia

(57) ABSTRACT

To provide a thinned display device with a touch sensor and to provide a highly reliable display device. A sensor layer including an electrode of a touch sensor is formed in advance over a support substrate which is different from a substrate which forms a display device so that the sensor layer can be separated, the sensor layer is separated from the support substrate, and the separated sensor layer is attached to one surface of a substrate the other surface of which is provided with a component such as a color filter, with a bonding layer interposed therebetween.

17 Claims, 9 Drawing Sheets

(56) References Cited

U.S. PATENT DOCUMENTS

| | | | |
|---|---|---|---|
| 7,133,096 B2 * | 11/2006 | Kabe | G02F 1/133634 349/114 |
| 7,147,740 B2 | 12/2006 | Takayama et al. | |
| 7,180,197 B2 | 2/2007 | Nishi et al. | |
| 7,229,900 B2 * | 6/2007 | Takayama | H01L 27/1214 156/230 |
| 7,307,006 B2 | 12/2007 | Okazaki et al. | |
| 7,335,573 B2 * | 2/2008 | Takayama | H01L 21/76251 257/E21.567 |
| 7,335,951 B2 | 2/2008 | Nishi et al. | |
| 7,368,318 B2 | 5/2008 | Yamazaki | |
| 7,422,935 B2 | 9/2008 | Yamazaki | |
| 7,436,050 B2 | 10/2008 | Yamazaki et al. | |
| 7,595,256 B2 | 9/2009 | Takayama et al. | |
| 7,663,306 B2 | 2/2010 | Imamura | |
| 7,820,529 B2 | 10/2010 | Tsurume et al. | |
| 7,824,950 B2 | 11/2010 | Monma et al. | |
| 7,867,907 B2 | 1/2011 | Shimomura et al. | |
| 7,879,687 B2 | 2/2011 | Yamada | |
| 7,973,313 B2 | 7/2011 | Arai et al. | |
| 8,067,294 B2 | 11/2011 | Takayama et al. | |
| 8,237,569 B2 | 8/2012 | Arai et al. | |
| 8,354,962 B2 | 1/2013 | Aoki | |
| 8,398,873 B2 | 3/2013 | Yoshikawa et al. | |
| 8,426,853 B2 | 4/2013 | Saito et al. | |
| 8,604,473 B2 | 12/2013 | Saito et al. | |
| 8,673,739 B2 | 3/2014 | Takayama et al. | |
| 8,698,776 B2 | 4/2014 | Kurashima | |
| 9,007,777 B2 | 4/2015 | Nagaoka et al. | |
| 9,493,119 B2 | 11/2016 | Takayama et al. | |
| 2003/0162312 A1 | 8/2003 | Takayama et al. | |
| 2004/0212749 A1 * | 10/2004 | Yu | G02F 1/13338 349/12 |
| 2005/0090075 A1 | 4/2005 | Takayama et al. | |
| 2006/0158095 A1 * | 7/2006 | Imamura | H01L 27/3279 313/500 |
| 2006/0187390 A1 | 8/2006 | Kabe et al. | |
| 2007/0126955 A1 * | 6/2007 | Hosoya | G02F 1/133351 349/113 |
| 2008/0049437 A1 | 2/2008 | Takayama et al. | |
| 2008/0076974 A1 | 3/2008 | Yamazaki et al. | |
| 2008/0284934 A1 * | 11/2008 | Umezaki | G02F 1/13452 349/43 |
| 2009/0261414 A1 | 10/2009 | Oikawa et al. | |
| 2010/0207520 A1 * | 8/2010 | Zhu | H01L 51/5281 313/506 |
| 2011/0095770 A1 | 4/2011 | Kurashima | |
| 2011/0133182 A1 * | 6/2011 | Saito | H01L 27/1214 257/43 |
| 2011/0216043 A1 | 9/2011 | Tamura et al. | |
| 2011/0316810 A1 * | 12/2011 | Tsujino | G02F 1/13338 345/174 |
| 2011/0318881 A1 | 12/2011 | Chida et al. | |
| 2012/0176325 A1 * | 7/2012 | Okazaki | G06F 3/041 345/173 |
| 2012/0182697 A1 * | 7/2012 | Nagaoka | G02F 1/13452 361/728 |
| 2012/0223049 A1 | 9/2012 | Yoshikawa et al. | |
| 2013/0058020 A1 * | 3/2013 | Jo | G02F 1/13452 361/679.01 |
| 2013/0120231 A1 * | 5/2013 | Jo | G02F 1/13452 345/98 |
| 2013/0299789 A1 | 11/2013 | Yamazaki et al. | |
| 2014/0008668 A1 | 1/2014 | Hirakata | |
| 2014/0014960 A1 * | 1/2014 | Yamazaki | G06F 3/0412 257/59 |
| 2014/0015764 A1 * | 1/2014 | Arola | G06F 3/041 345/173 |
| 2014/0043546 A1 * | 2/2014 | Yamazaki | G02F 1/13338 349/12 |
| 2017/0125454 A1 | 5/2017 | Takayama et al. | |

FOREIGN PATENT DOCUMENTS

| | | |
|---|---|---|
| EP | 2365417 | 9/2011 |
| EP | 2466631 | 6/2012 |
| EP | 2641883 | 9/2013 |
| JP | 2001-247827 A | 9/2001 |
| JP | 2003-229548 A | 8/2003 |
| JP | 2005-178363 A | 7/2005 |
| JP | 2006-201421 A | 8/2006 |
| JP | 2008-009750 | 1/2008 |
| JP | 2010-191287 A | 9/2010 |
| JP | 2011-095806 A | 5/2011 |
| JP | 2011-139045 A | 7/2011 |
| JP | 2011-198207 A | 10/2011 |
| JP | 2011-210242 A | 10/2011 |
| JP | 4845232 | 12/2011 |
| JP | 2012-145779 A | 8/2012 |
| KR | 2003-0044840 A | 6/2003 |
| KR | 2004-0077559 A | 9/2004 |
| KR | 2006-0084794 A | 7/2006 |
| TW | 200300610 | 6/2003 |
| WO | WO-2010/095189 | 8/2010 |
| WO | WO-2011/040081 | 4/2011 |

\* cited by examiner

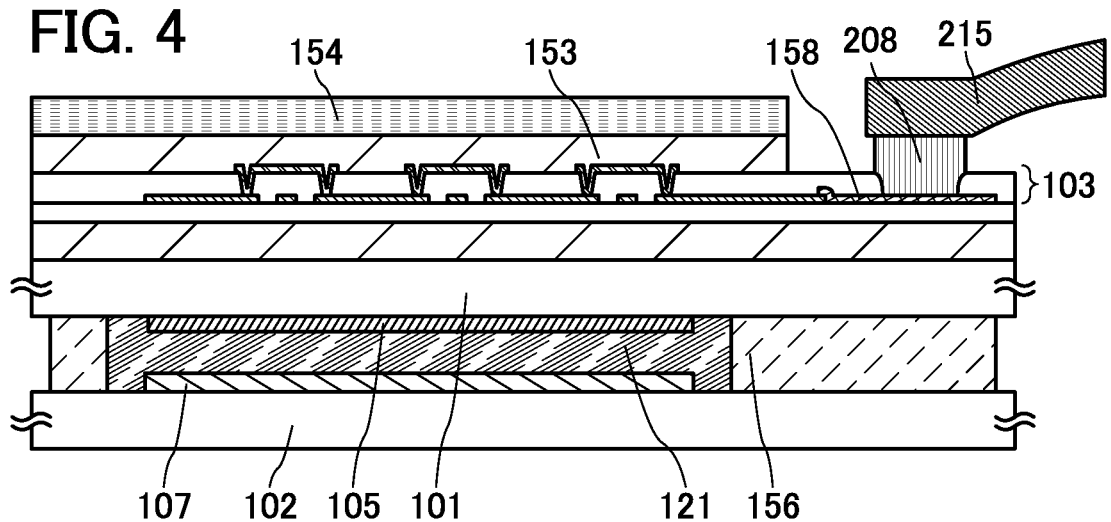

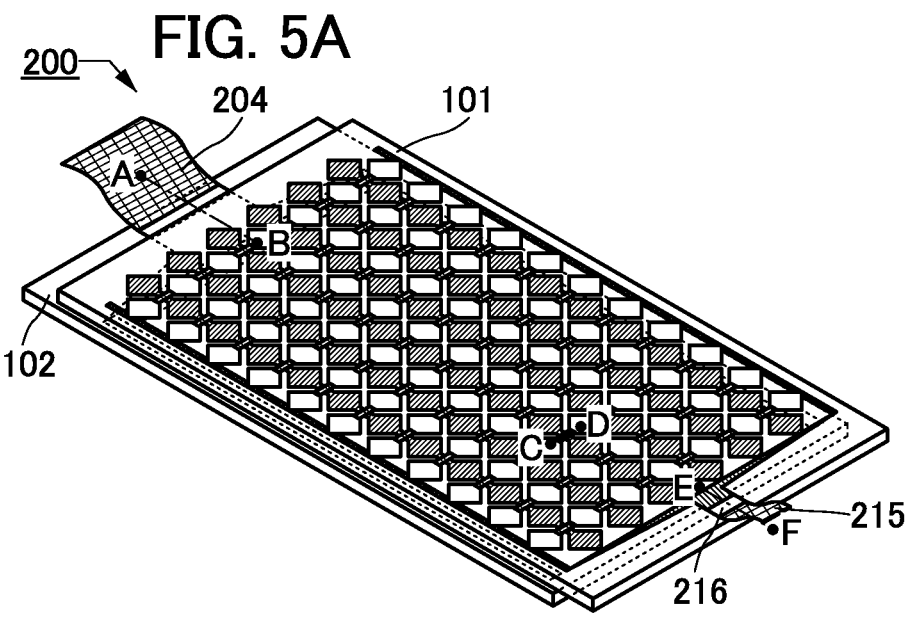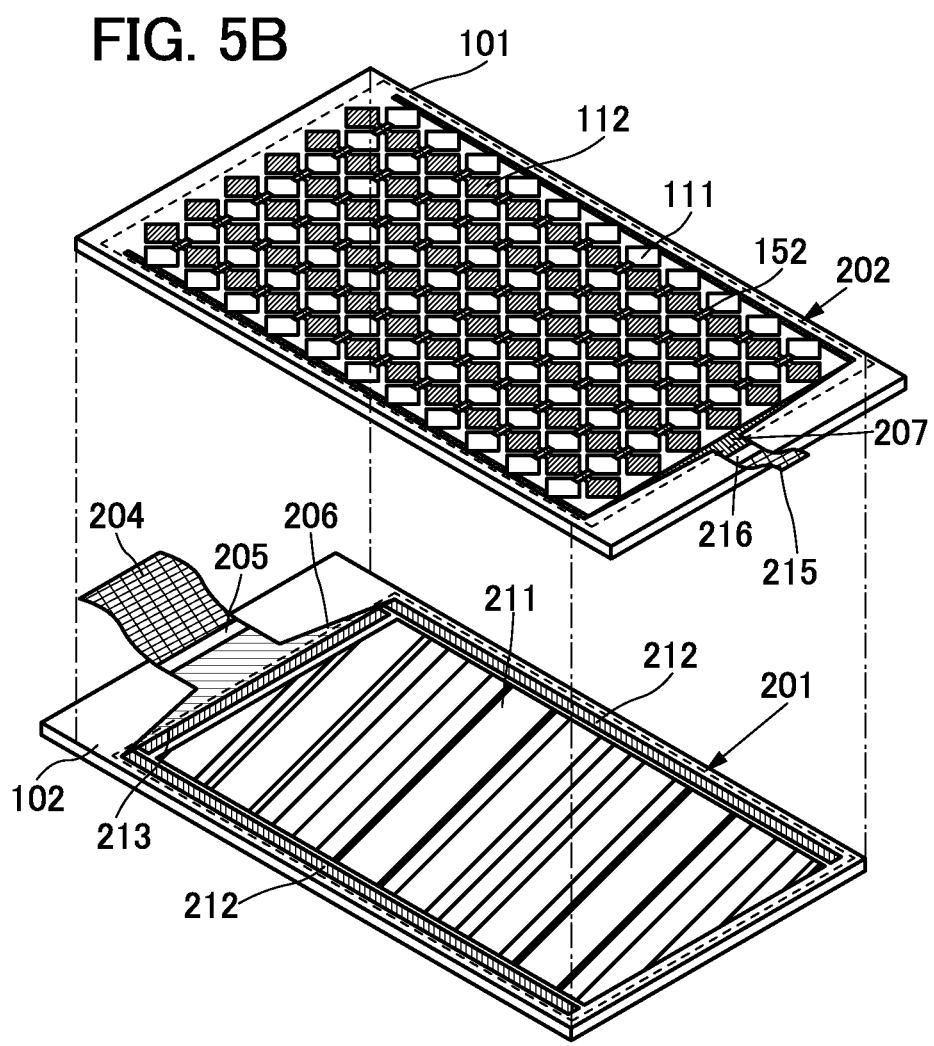

DISPLAY DEVICE AND METHOD FOR MANUFACTURING THE SAME

BACKGROUND OF THE INVENTION

1. Field of the Invention

The present invention relates to a display device with a touch sensor.

2. Description of the Related Art

A variety of electronic devices each including a display device, such as a cell phone, a smartphone, a personal computer, a tablet terminal, a portable game machine, and a portable music player, have recently come into widespread use. More intuitively operable electronic devices can be each obtained by providing a touch sensor so as to overlap with a display portion for image display as an interface of such an electronic device.

In the display portion, a liquid crystal display device, a display device including an organic electroluminescent (EL) element, an electronic paper performing display by an electrophoretic method or the like, or the like can be typically used.

Typical touch sensors are of resistive type and of capacitive type; besides, a variety of types such as a surface acoustic wave type and an infrared type are known.

Further, in recent years, a reduction in thickness of a display device with a touch sensor has been considered in order to reduce the weight of an electronic device and increase the degree of freedom for design. For example, Patent Document 1 discloses a structure in which, between a substrate on a viewing side and a polarizing plate provided over an outer surface of the substrate, a conductive film of a capacitive touch panel using the polarizing plate as a touch surface is provided.

REFERENCE

Patent Document

[Patent Document 1] Japanese Published Patent Application No. 2008-009750

SUMMARY OF THE INVENTION

A structure in which an electrode of a touch sensor is provided between a polarizing plate and one of two substrates which interpose a display element is effective in reducing the thickness of a display device. However, a conventional method as described in Patent Document 1 has problems described below.

First, FIG. 2 and the like in Patent Document 1 illustrate a structure in which an electrode of a touch sensor (which corresponds to a conductive film for a capacitive touch panel in Patent Document 1) is formed on one surface of a polarizing plate. However, in general, a polarizing plate has low heat resistance and has insufficient resistance to a film formation step or an etching step of a conductive film, for example, and thus it is difficult to form a pattern of the electrode directly on the polarizing plate. Further, a polarizing plate has insufficient resistance to heat or the like which is applied in a pressure bonding step of electrically connecting the electrode of the touch sensor and a flexible printed circuit (FPC) or the like, and thus it is difficult to connect an FPC or the like. Therefore, it is extremely difficult to provide the electrode of the touch sensor on one surface of the polarizing plate.

Further, FIG. 5 and the like in Patent Document 1 illustrate a structure in which an electrode of a touch sensor is provided on one surface of a substrate the other surface of which is provided with color filters. However, in the case of forming a color filter or an electrode of a touch sensor on respective surfaces of a substrate in this manner, there is a problem in that the color filter is damaged by a member such as a stage of an apparatus being in contact with the surface where the color filter is formed, for example, at the time of forming a pattern of the electrode on the back surface of the substrate the front surface of which is provided with the color filter. Further, also in the case where the electrode of the touch sensor is formed first, the pattern of the electrode is damaged.

As described above, by a conventional method, it is difficult to form an electrode of a touch sensor on one surface of a substrate the other surface of which is provided with a component such as a color filter. A similar problem occurs also in the case where one electrode, an alignment film, or the like of a liquid crystal display element is provided in addition to a color filter as a component provided on one surface of the substrate.

In view of the foregoing, an object of one embodiment of the present invention is to provide a thinned display device with a touch sensor. Another object is to provide a highly reliable display device.

In order to achieve the above objects, the present inventor has arrived at the following idea as one embodiment of the present invention: a sensor layer including an electrode of a touch sensor is formed in advance over a support substrate which is different from a substrate which forms a display device so that the sensor layer can be separated, the sensor layer is separated from the support substrate, and the separated sensor layer is provided over one surface of the substrate the other surface of which is provided with a component.

That is, one embodiment of the present invention is a method for manufacturing a display device including a step of stacking a separation layer, a layer to be separated, and a sensor layer in this order over a support substrate; a step of separating a stacked body including the layer to be separated and the sensor layer from the support substrate, and a step of providing the stacked body over a second surface of a first substrate which is opposite to a first surface of the first substrate which is provided with a component with a first bonding layer interposed therebetween.

With such a method, a defect such as damage to a component in forming a sensor layer including an electrode of a touch sensor does not occur, and a touch sensor can be formed with high yield on a surface of a substrate opposite to a surface of the substrate which is provided with the component. Accordingly, a thinned display device with a touch sensor can be manufactured with high yield.

Here, as an example of the above component with which a substrate is provided, a color filter, a black matrix, a spacer, or the like can be given. In addition to the above, for example, in the case of a liquid crystal display device, one electrode, an overcoat, an alignment film, or the like of a liquid crystal element can be given. Further, in the case of a display device including an organic EL element, an auxiliary wiring to which one electrode of the organic EL element is electrically connected, or the like can be given.

Further, the method for manufacturing a display device further includes a step of attaching a first substrate to a second substrate provided with a display element so that the display element faces the component. After the first substrate is attached to the second substrate, the stacked body is preferably provided over the second surface of the first substrate.

With such a method, the component is protected by the second substrate provided with the display element when the sensor layer including the electrode of the touch sensor is attached, and thus a display device can be manufactured with higher yield.

Further, a function of a touch sensor can be added later to a conventional display device which is not provided with a touch sensor by attaching a sensor layer after manufacture of the conventional display device.

Further, any of the above methods for manufacturing a display device preferably further includes a step of providing a polarizing plate over the sensor layer with a second bonding layer interposed therebetween after the stacked body is provided over the second surface of the first substrate.

With such a method, a polarizing plate can be incorporated in a display device with a touch sensor, and thus a thinner display device can be obtained. The polarizing plate can also be used as a touch surface.

Further, when the display device is one that includes an organic EL element, the use of a circularly polarizing plate as the polarizing plate can suppress surface reflection and allow the display device to have high visibility.

Further, any of the above methods for manufacturing a display device preferably further includes, after the step of providing the stacked body over the second surface of the first substrate, a step of pressure bonding of an FPC which is electrically connected to the sensor layer.

With such a method, the first substrate which has higher heat resistance and higher mechanical strength than a polarizing plate can be used as a support in pressure bonding of the FPC which is electrically connected to the sensor layer, so that a defect caused in the pressure bonding is suppressed and a highly reliable display device can be obtained.

Another embodiment of the present invention is a display device including a first substrate and a second substrate which face each other. A first surface of the first substrate which faces the second substrate is provided with a component. A first bonding layer and a sensor layer are stacked over a second surface of the first substrate which is opposite to the first surface. A surface of the second substrate which faces the first substrate is provided with a display element.

By the method for manufacturing a display device of one embodiment of the present invention, a display device which has a touch sensor and whose thickness is reduced in this manner can be obtained.

Further, it is preferable that a polarizing plate be provided over the sensor layer with a second bonding layer interposed therebetween in the display device.

With such a structure, one surface of the polarizing plate can be used as a touch surface, and thus an extremely thin display device can be achieved.

Further, the display element in the display device preferably includes a pair of electrodes and a liquid crystal in an electric field formed by the pair of electrodes.

Alternatively, the display element in the display device preferably includes a pair of electrodes and a layer containing a light-emitting organic compound which is interposed between the pair of electrodes.

As described above, a display device of one embodiment of the present invention can be applied to a variety of display devices such as liquid crystal display devices each including a liquid crystal element or display devices each including an organic EL element. In addition, a display device of one embodiment of the present invention can be applied to an electronic paper performing a display in an electrophoretic mode or the like.

Note that in this specification, the display device includes any of the following modules in its category: a module in which a connector such as an FPC or a tape carrier package (TCP) is attached to a display device; a module having a TCP provided with a printed wiring board at the end thereof; and a module having an integrated circuit (IC) directly mounted over a substrate over which a light-emitting element is formed by a chip on glass (COG) method.

According to one embodiment of the present invention, a thinned display device with a touch sensor can be provided. Further, a highly reliable display device can be provided.

BRIEF DESCRIPTION OF THE DRAWINGS

In the accompanying drawings:

FIG. 4 illustrates an example of a method for manufacturing a display device in one embodiment of the present invention;

FIGS. 5A and 5B illustrate a structural example of a display device in one embodiment of the present invention;

DETAILED DESCRIPTION OF THE INVENTION

Figure 1A:
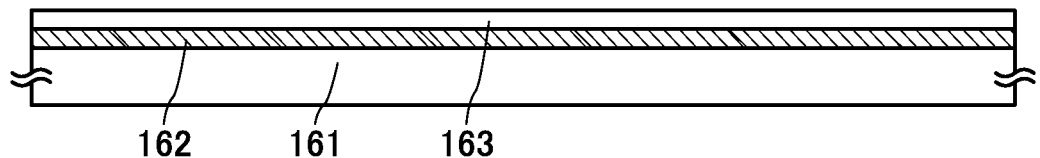
FIGS. 1A to 1D illustrate an example of a method for manufacturing a display device in one embodiment of the present invention.

Embodiments will be described in detail with reference to the drawings. Note that the present invention is not limited to the following description, and it will be easily understood by those skilled in the art that various changes and modifications can be made without departing from the spirit and scope of the present invention. Therefore, the present invention should not be construed as being limited to the description in the following embodiments. Note that in the structures of the invention described below, the same portions or portions having similar functions are denoted by the same reference numerals in different drawings, and description of such portions is not repeated.

Note that in each drawing described in this specification, the size, the thickness, or the region of each component is exaggerated for clarity in some cases. Therefore, embodiments of the present invention are not limited to such scales.

Embodiment 1

In this embodiment, a method for manufacturing a display device of one embodiment of the present invention is described with reference to drawings. In this embodiment, an example of a method for manufacturing a liquid crystal display device with a touch sensor is described.

First, a sensor layer 103 is formed over a support substrate 161 and separated from the support substrate 161. The steps up to here are described with reference to FIGS. 1A to 1D. Note that here, the case of using a projected capacitive touch sensor for the sensor layer 103 is described.

First, the support substrate 161 is prepared. As the support substrate 161, a substrate having a relatively flat surface is used. As the support substrate 161, a non-light-transmitting substrate such as a metal substrate or a ceramic substrate can be used in addition to a glass substrate or a resin substrate.

Next, a separation layer 162 and a layer to be separated 163 are stacked over the support substrate 161 (FIG. 1A). Here, a combination of materials which can be separated at the interface between the separation layer 162 and the layer to be separated 163 is used for the separation layer 162 and the layer to be separated 163.

For example, a metal such as tungsten is used for the separation layer 162, and an oxide such as silicon oxide is used for the layer to be separated 163. At this time, a surface of the metal is oxidized by contact with the oxide, and an oxide of the metal (e.g., tungsten oxide) is formed. Note that heat treatment may be performed to promote the oxidation reaction after the layer to be separated 163 is formed. Here, by application of an external force with which the separation layer 162 is physically separated, separation occurs at the interface between the separation layer 162 and the layer to be separated 163.

Alternatively, a metal and a resin such as polyimide may be used as the separation layer 162 and the layer to be separated 163, respectively; in such a case, separation can be performed by the control of adhesion between the separation layer 162 and the layer to be separated 163. Further alternatively, the separation layer 162 and the layer to be separated 163 each may have a surface with extremely high planarity; in such a case, bonding can be performed by close contact between the two surfaces with high planarity.

Note that a surface of the support substrate 161 may be used as the separation layer 162 so that the layer to be separated 163 is formed on and in contact with the support substrate 161. For example, a metal substrate and a resin can be used as the support substrate 161 and the layer to be separated 163, respectively. Alternatively, for example, a relatively thick glass substrate and a relatively thin glass substrate can be used as the support substrate 161 and the layer to be separated 163, respectively; in such a case, bonding can be performed by close contact between surfaces of the glass substrates which have high planarity.

Next, an electrode 111 and an electrode 112, which have a light-transmitting property, are formed over the layer to be separated 163. The electrode 111 and the electrode 112 are formed in such a manner that after a conductive film is formed by a sputtering method or the like, an unnecessary portion of the conductive film is removed using a patterning technique such as a photolithography method.

As a light-transmitting conductive material, a conductive oxide such as indium oxide, indium tin oxide, indium zinc oxide, zinc oxide, or zinc oxide to which gallium is added can be used.

Subsequently, a wiring 158 electrically connected to the electrode 111 or the electrode 112 is formed. Part of the wiring 158 serves as an external connection electrode which is electrically connected to an FPC to be described later. For the wiring 158, a metal material such as aluminum, gold, platinum, silver, nickel, titanium, tungsten, chromium, molybdenum, iron, cobalt, copper, or palladium or an alloy material containing any of these metal materials can be used.

After that, an insulating layer 151 which has a light-transmitting property and covers the electrode 111 and the electrode 112 is formed. As a material of the insulating layer 151, for example, a resin such as acrylic or epoxy, a resin having a siloxane bond, or an inorganic insulating material such as silicon oxide, silicon oxynitride, or an aluminum oxide can be used.

Next, after openings which reach the electrode 111 are formed in the insulating layer 151, a wiring 152 that is electrically connected to the electrode 111 is formed over the insulating layer 151. The wiring 152 is preferably formed using a light-transmitting conductive material similar to that of the electrode 111 and the electrode 112, in which case the aperture ratio of the display device can be improved. Although a material which is the same as that of the electrode 111 and the electrode 112 may be used for the wiring 152, a material having higher conductivity than the material of the electrode 111 and the electrode 112 is preferably used for the wiring 152.

Further, an opening reaching the wiring 158 is formed in the insulating layer 151 at the same time as the formation of the above-described openings. Further, a conductive film may be formed in a region which overlaps with the opening over the wiring 158 at the same time as the formation of the wiring 152, which can prevent an exposed part of the wiring 158 from being removed in the step of forming the wiring 152.

The electrode 112 is provided in the form of stripes in one direction (a direction perpendicular to the paper). Further, a pair of electrodes 111 is provided so as to sandwich the electrode 112. Further, the wiring 152 which electrically connects the pair of electrodes 111 is provided so as to intersect with the electrode 112. Here, one electrode 112 and a plurality of electrodes 111 electrically connected to each other by the wiring 152 do not necessarily intersect orthogonally and may form an angle of less than 90°.

Further, an insulating layer covering the insulating layer 151 and the wiring 152 may be formed. The insulating layer can serve as a protection layer. Note that in the case where the insulating layer is provided, it is preferable that an opening reaching the wiring 158 be provided and part of the wiring 158 be exposed.

Figure 1B:
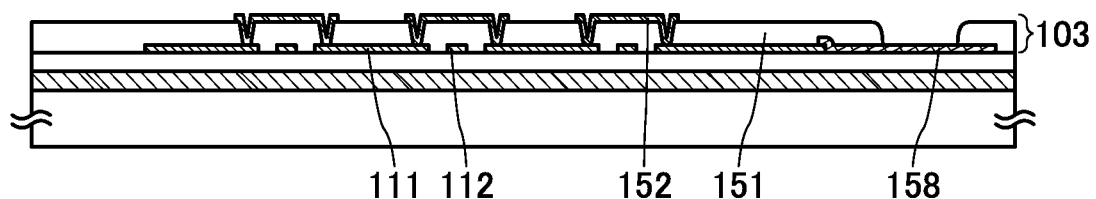

Through the above steps, the sensor layer 103 can be formed over the layer to be separated 163. The sensor layer 103 includes the electrode 111, the electrode 112, the insulating layer 151, the wiring 152, and the wiring 158. FIG. 1B illustrates a schematic cross-sectional view at this stage.

Figure 1C:
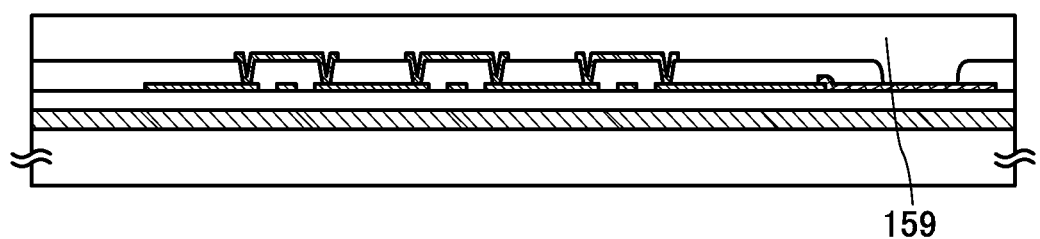

Next, a supporting material 159 is formed over the sensor layer 103 (see FIG. 1C). When the supporting material 159 is formed, a stacked body including the sensor layer 103 and the layer to be separated 163 can be easily separated from the separation layer 162, and in addition, stress applied to the sensor layer 103 and the layer to be separated 163 can be relieved. As the supporting material 159, for example, a material which can be dissolved and thereby removed by immersion in a solvent is preferably used. Examples of this type of material include, for example, a water-soluble adhesive which can be dissolved and thereby removed by immersion in water. Alternatively, as the supporting material 159, a stacked body of the above-described material which can be removed and a flexible film may be used.

Figure 1D:
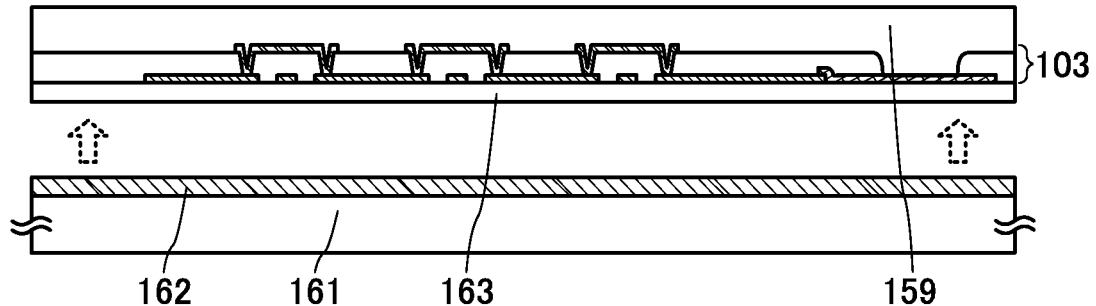

After that, separation is caused at the interface between the separation layer 162 and the layer to be separated 163, so that the stacked body including the sensor layer 103 and the layer to be separated 163 is separated from the support substrate 161 (see FIG. 1D).

For the separation, for example, the support substrate 161 is fixed by a suction stage or the like and a starting point of separation is formed at the interface between the separation layer 162 and the layer to be separated 163. For example, the starting point of separation may be formed by inserting a sharp instrument such as a knife into the boundary between the separation layer 162 and the layer to be separated 163. Alternatively, the starting point of separation may be formed by dripping a liquid that has low surface tension (such as alcohol or water) onto an end portion of the layer to be separated 163 so that the liquid penetrates into the interface between the separation layer 162 and the layer to be separated 163 by using capillary action.

Then, by applying physical force gradually from the starting point of separation in a direction substantially perpendicular to the attachment surfaces, separation can be easily caused without damage to the sensor layer 103 and the layer to be separated 163. At this time, for example, separation may be caused by attaching a tape or the like to the supporting material 159 and pulling the tape in an upper direction, or separation may be caused by pulling an end portion of the supporting material 159 with a hook-like member. Alternatively, separation may be caused by attaching a member capable of vacuum suction to the back side of the supporting material 159.

At the time of separation, static electricity might be generated and the sensor layer 103 or the layer to be separated 163 might be charged therewith. When the sensor layer 103 or the layer to be separated 163 is charged, a circuit or an element in the sensor layer 103 might be damaged by electrostatic discharge (ESD). In order to suppress this, separation is preferably caused in a state where a conductive liquid (e.g., an ionic liquid, water including ions such as carbonated water, or the like) is dripped onto the starting point of separation and the liquid is constantly in contact with the separation interface. Alternatively, separation may be caused while the generation of ESD is being suppressed using an ionizer or the like.

Figure 2A:
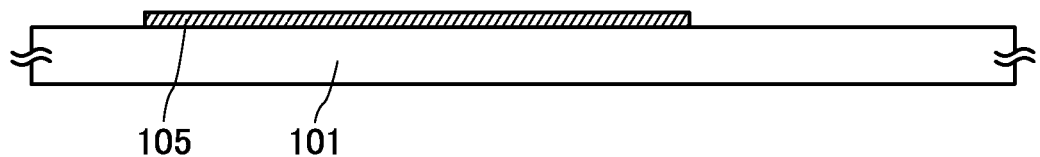
FIGS. 2A to 2D illustrate an example of a method for manufacturing a display device in one embodiment of the present invention.

Subsequently, a color filter layer 105 is formed over one surface (a first surface) of a first substrate 101 (FIG. 2A).

For the first substrate 101, a material having an insulating surface and a light-transmitting property with respect to visible light is used. As a material of the first substrate 101, a glass material, a resin material, or the like can be used. Further, when the display device is used being curved, a flexible resin material, a glass material that is thin enough to have flexibility, or a composite material or a laminated material of these materials is used for the first substrate 101.

The color filter layer 105 includes a color filter which overlaps with a liquid crystal element to be formed later. For example, when the color filter layer 105 is provided with three color filters of red (R), green (G), and blue (B), a display device capable of full-color display can be obtained. The color filter layer 105 may include a black matrix, an overcoat, or the like in addition to a color filter.

The color filter layer 105 can be formed using a photosensitive material including a pigment by a photolithography method. Further, as the color filter layer 105, a black matrix may be provided between color filters with different colors. Further, an overcoat is preferably provided so as to cover the color filters and the black matrix.

Note that one of electrodes of the liquid crystal element may be formed over the color filter layer 105 in accordance with the structure of the liquid crystal element to be used. Note that the electrode becomes part of the liquid crystal element to be formed later. Further, an alignment film may be formed over the electrode.

Note that an insulating layer which protects the first surface of the first substrate 101 may be formed over the first surface of the first substrate 101 in advance before the color filter layer 105 is formed.

Figure 2B:
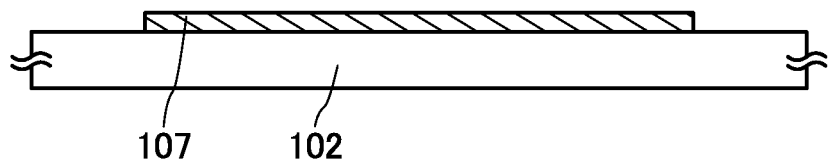

Then, a TFT layer 107 is formed over one surface of a second substrate 102 (FIG. 2B).

The second substrate 102 can be formed using a material which is similar to that of the first substrate 101.

The TFT layer 107 includes at least a transistor. The TFT layer 107 may include a capacitor in addition to a transistor. Further, the TFT layer 107 may include a driver circuit (a gate driver circuit or a source driver circuit) or the like. Furthermore, the TFT layer 107 may include a wiring or an electrode.

The TFT layer 107 can be manufactured by a variety of manufacturing methods. For example, in the case of an active matrix display device in which a liquid crystal element is used, a gate electrode (and a wiring), a gate insulating layer, a semiconductor layer, and a source electrode and a drain electrode (and wirings) which form a transistor are provided over the first substrate 101. Further, an electrode of the liquid crystal element is formed thereover so as to be electrically connected to the transistor. Note that the electrode becomes part of the liquid crystal element to be formed later. Further, an alignment film for controlling alignment of a liquid crystal may be formed over the electrode.

Through the above steps, the first substrate 101 provided with the color filter layer 105, the second substrate 102 provided with the TFT layer 107, and the stacked body including the sensor layer 103 and the layer to be separated 163 which were separated from the support substrate 161 can be manufactured. Note that there is no limitation on the manufacturing order of the first substrate 101, the second substrate 102, and the stacked body, and any of them may be manufactured first. It is also possible to manufacture two or more of them at the same time.

Figure 2C:
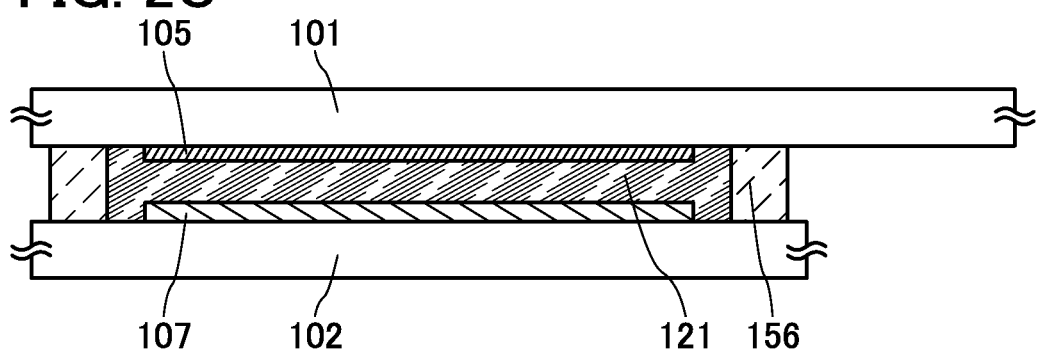

Next, liquid crystal 121 is sealed with a sealant 156 in a state where the liquid crystal 121 is interposed between the first substrate 101 and the second substrate 102 (see FIG. 2C). Through the above steps, a liquid crystal element including the liquid crystal 121 and a pair of electrodes formed at the same time as formation of the TFT layer 107 or the color filter layer 105 is formed.

The liquid crystal 121 can be formed by a dispenser method (a dropping method), an injecting method in which a liquid crystal is injected using a capillary action after the first substrate 101 is attached to the second substrate 102, or the like.

For the sealant 156, a thermosetting resin or an ultraviolet curable resin can be used. For example, an acrylic resin, a urethane resin, an epoxy resin, or a resin having a siloxane bond can be used. Further, the sealant 156 may be formed using glass frit including low-melting-point glass.

Figure 2D:
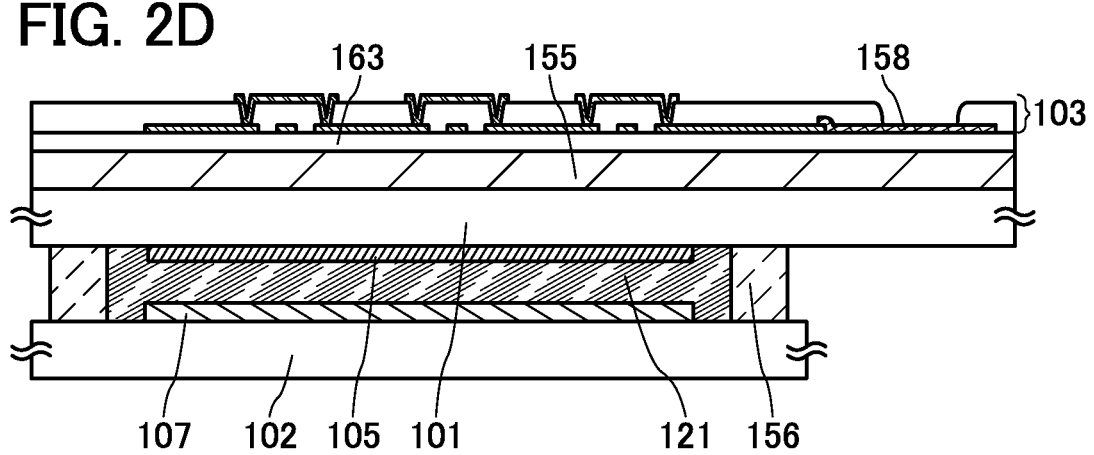

After that, the stacked body including the sensor layer 103 and the layer to be separated 163 is attached to a surface (a second surface) opposite to the surface (the first surface) of the first substrate 101 provided with the color filter layer 105, with a bonding layer 155 interposed therebetween, and then the supporting material 159 is removed (FIG. 2D).

The bonding layer 155 is acceptable as long as it has a light-transmitting property and can bond a surface of the layer to be separated 163 and a surface to be bonded. The bonding layer 155 can be formed using a thermosetting resin or an ultraviolet curable resin. For example, an acrylic resin, a urethane resin, an epoxy resin, or a resin having a siloxane bond can be used.

The supporting material 159 can be removed easily by being immersed in a solvent or the like. At this time, the sealant 156, the bonding layer 155, or the like may be in contact with the solvent; therefore, a material of the sealant 156, the bonding layer 155, or the like is preferably a material resistant to the solvent used for removal of the supporting material 159.

In this manner, the step of attaching the stacked body including the sensor layer 103 and the layer to be separated 163 to the first substrate 101 is performed after the first substrate 101 and the second substrate 102 are attached to each other, whereby the stacked body can be attached to the first substrate 101 in a state where a back surface of the second substrate 102 is placed on a flat stage or the like, so that the stacked body can be attached to the first substrate 101 stably, which leads to improvement in alignment accuracy of the sensor layer 103.

Note that as illustrated in FIG. 2D, a region of the sensor layer 103 where the wiring 158 is exposed, that is, a part of the first substrate 101 which overlaps with a region to which an FPC is to be connected later, preferably extends beyond an end portion of the second substrate 102.

Figure 3A:
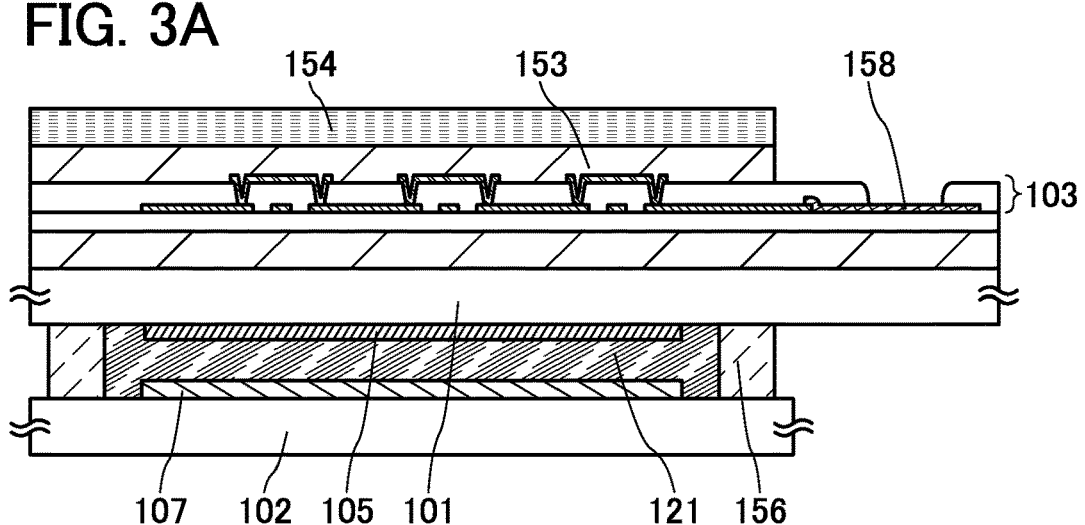
FIGS. 3A to 3C illustrate the example of the method for manufacturing the display device in one embodiment of the present invention.

Subsequently, a polarizing plate 154 is attached to the sensor layer 103 with a bonding layer 153 interposed therebetween (FIG. 3A). At this time, the bonding layer 153 and the polarizing plate 154 are provided so as not to cover the exposed region of the wiring 158.

As the bonding layer 153, a material which is similar to that of the bonding layer 155 or the like can be used.

For the polarizing plate 154, a material capable of producing linearly polarized light from natural light or circularly polarized light is used. For example, a material whose optical anisotropy is obtained by disposing dichroic substances in one direction can be used. Such a polarizing plate can be formed in such a manner that an iodine-based compound or the like is adsorbed to a film such as a polyvinyl alcohol film and the film or the like is stretched in one direction, for example. Note that as the dichroic substance, a dye-based compound or the like as well as an iodine-based compound can be used.

A film-like, sheet-like, or plate-like material is used for the polarizing plate 154.

Further, in the case where a surface of the polarizing plate 154 which does not face the sensor layer 103 is used as a touch surface of the touch sensor, the surface is preferably coated with a hard layer formed using an inorganic material or an organic material.

Next, an FPC 215 and the exposed region of the wiring 158 in the sensor layer 103 are subjected to pressure bonding with a connection layer 208 interposed therebetween, so that the FPC 215 and the wiring 158 are electrically connected to each other.

For the connection layer 208, an anisotropic conductive film (ACF), anisotropic conductive paste (ACP), or the like can be used, for example.

Figure 3B:
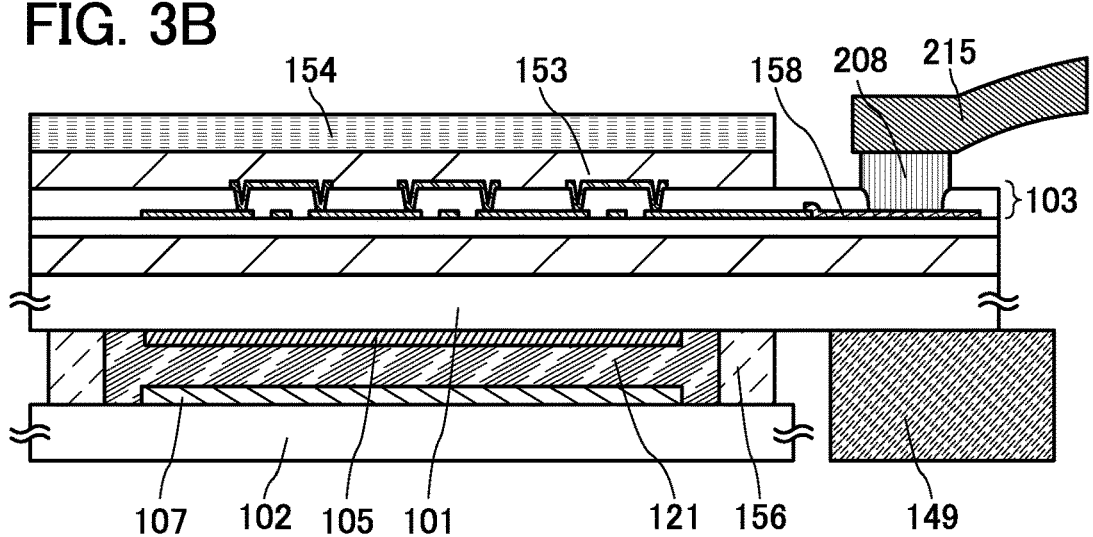

Note that the FPC and the exposed region of the wiring 158 in the sensor layer 103 are preferably subjected to the pressure bonding in a state where a back surface of the first substrate 101 is supported by a supporting member 149 in a region which overlaps with the pressure bonding portion as illustrated in FIG. 3B, which can prevent the first substrate 101 from being damaged.

Here, as illustrated in FIG. 4, when end portions of the first substrate 101 and the second substrate 102 which are positioned on the FPC 215 side are made to roughly match and the sealant 156 is provided below the pressure bonding portion of the FPC 215, the pressure bonding can be performed without using the supporting member 149.

Figure 3C:
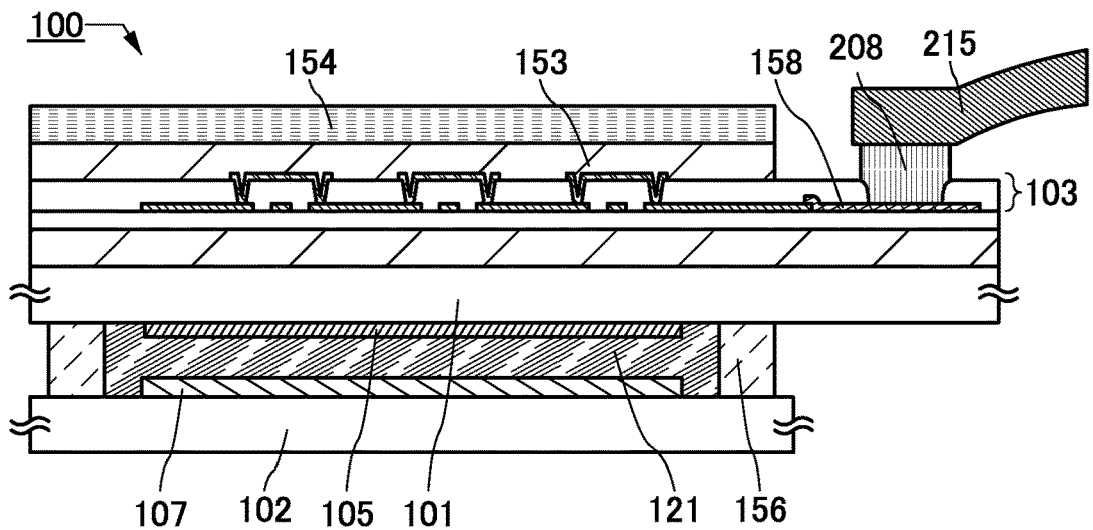

Through the above steps, a display device 100 with a touch sensor can be manufactured (FIG. 3C).

Note that in this embodiment, an example is described in which a projected capacitive touch sensor is used for the sensor layer 103; however, the sensor layer 103 is not limited to this, and a sensor functioning as a touch sensor which senses proximity or touch of a conductive object to be sensed such as a finger from an outer side than the polarizing plate 154 can be used. The touch sensor provided in the sensor layer 103 is preferably a capacitive touch sensor. Examples of the capacitive touch sensor are of a surface capacitive type, of a projected capacitive type, and the like. Further, examples of the projected capacitive type are of a self capacitive type, a mutual capacitive type, and the like mainly in accordance with the difference in the driving method. The use of a mutual capacitive type is preferable because of simultaneous sensing of multiple points (also referred to as multipoint sensing or multi-touch).

Further, although the step of attaching the stacked body including the sensor layer 103 and the layer to be separated 163 to the first substrate 101 is performed after the first substrate 101 and the second substrate 102 are attached to each other in this embodiment, the step can also be performed right after a component such as the color filter is formed. In this case, when a stage provided with a depression so as not to be in contact with a component such as the color filter is used as a stage which supports the first substrate 101 at the time of attaching the stacked body, a component such as the color filter can be prevented from being damaged due to contact with the stage.

Here, in a method for forming a color filter or an electrode of a touch sensor on a surface which is opposite to a surface provided with the color filter or the electrode of a touch sensor like the above-described conventional method, a variety of steps such as a step which needs high positional accuracy, a step using a vacuum apparatus, and a step of rotating a substrate in a spin coating method, cleaning, or the like in a state where the substrate is held need to be performed; therefore, damage to a component provided on the back surface cannot be prevented by using such a stage having a special shape in all apparatuses which are used in the formation steps. In contrast, in the method for manufacturing a display device of one embodiment of the present invention, the first substrate 101 needs to be fixed only in the step of attaching the stacked body including the sensor layer 103 and the layer to be separated 163 to the first substrate 101. Accordingly, a component such as a color filter and a touch sensor can be formed on a front surface and a back surface of one substrate with high yield.

When the method for manufacturing the display device 100 described in this embodiment is used, a touch sensor can be formed with high yield on a surface of the substrate opposite to a surface of the substrate which is provided with a component of the display device without a defect such as damage of the component such as a color filter in forming an electrode of the touch sensor. Accordingly, a thinned display device with a touch sensor can be manufactured with high yield.

Further, since the sensor layer 103 formed using a thin film is provided on the back surface of the first substrate 101 with the bonding layer 155 interposed therebetween in the display device 100 manufactured by such a method, the thickness of the display device is hardly increased when the function of the touch sensor is added to the display device, so that a thinned display device can be achieved. Accordingly, the degree of freedom of design at the time when such a display device is incorporated in an electronic device can be increased.

This embodiment can be combined with any of the other embodiments disclosed in this specification as appropriate.

Embodiment 2

In this embodiment, a more specific structural example of a display device of one embodiment of the present invention is described with reference to drawings. Note that description of the same portions as those in the above embodiment is omitted in some cases.

Structural Example 1

FIG. 5A is a schematic perspective view of a display device 200 described in this structural example. Note that FIGS. 5A and 5B illustrate only major components for simplicity. FIG. 5B is a developed perspective view schematically illustrating the display device 200.

The display device 200 includes a display portion 201 and a touch sensor 202. The display portion 201 is interposed between the first substrate 101 and the second substrate 102.

The second substrate 102 is provided with the display portion 201 and a plurality of wirings 206 electrically connected to the display portion 201. The plurality of wirings 206 is led to the periphery of the second substrate 102, and some of the wirings form part of an external connection electrode 205 for electrical connection to an FPC 204.

The display portion 201 includes a pixel portion 211 including a plurality of pixels, a source driver circuit 212, and a gate driver circuit 213. Although FIG. 5B illustrates a structure in which two source driver circuits 212 are positioned on both sides of the pixel portion 211, one source driver circuit 212 may be positioned along one side of the pixel portion 211.

As a display element which can be used in the pixel portion 211 of the display portion 201, any of a variety of display elements such as an organic EL element, a liquid crystal element, and a display element performing display by an electrophoretic method or the like can be used.

The first substrate 101 is provided with the touch sensor 202 and a plurality of wirings 207 electrically connected to the touch sensor 202. The touch sensor 202 is provided on a surface of the first substrate 101 which is opposite to a surface of the first substrate 101 facing the second substrate 102. The plurality of wirings 207 is led to the periphery of the first substrate 101, and some of the wirings form part of an external connection electrode 216 for electrical connection to an FPC 215.

The touch sensor 202 illustrated in FIG. 5B is an example of a projected capacitive touch sensor. The touch sensor 202 includes the electrode 111 and the electrode 112. The electrode 111 and the electrode 112 are each electrically connected to any one of the plurality of wirings 207.

Here, the electrode 111 and the electrode 112 are each in the form of a series of quadrangles arranged in one direction as illustrated in FIGS. 5A and 5B. Each of the electrodes 111 is in the form of a quadrangle. The plurality of electrodes 111 arranged in a line in a direction intersecting with the direction in which the electrode 112 extends is electrically connected to each other by the wiring 152. The electrodes are preferably arranged so that the area of intersection portions of the electrode 111 and the electrode 112 becomes as small as possible. Such a shape can reduce the area of regions where the electrodes are not provided and decrease luminance unevenness of light passing through the touch sensor 202 which may be caused by a difference in transmittance depending on whether the electrodes are provided or not.

Note that the shapes of the electrode 111 and the electrode 112 are not limited thereto and can be any of a variety of shapes. For example, a structure may be employed in which the plurality of electrodes 111 is arranged so that gaps between the electrodes 111 are reduced as much as possible, and the electrode 112 is spaced apart from the electrodes 111 with an insulating layer interposed therebetween to have regions not overlapping with the electrodes 111. In that case, it is preferable to provide, between two adjacent electrodes 112, a dummy electrode which is electrically insulated from these electrodes, because the area of regions having different transmittances can be reduced.

Cross-Sectional Structural Example 1

A cross-sectional structural example of the display device 200 in which a liquid crystal element is included in the display portion 201 is described below.

Figure 6:
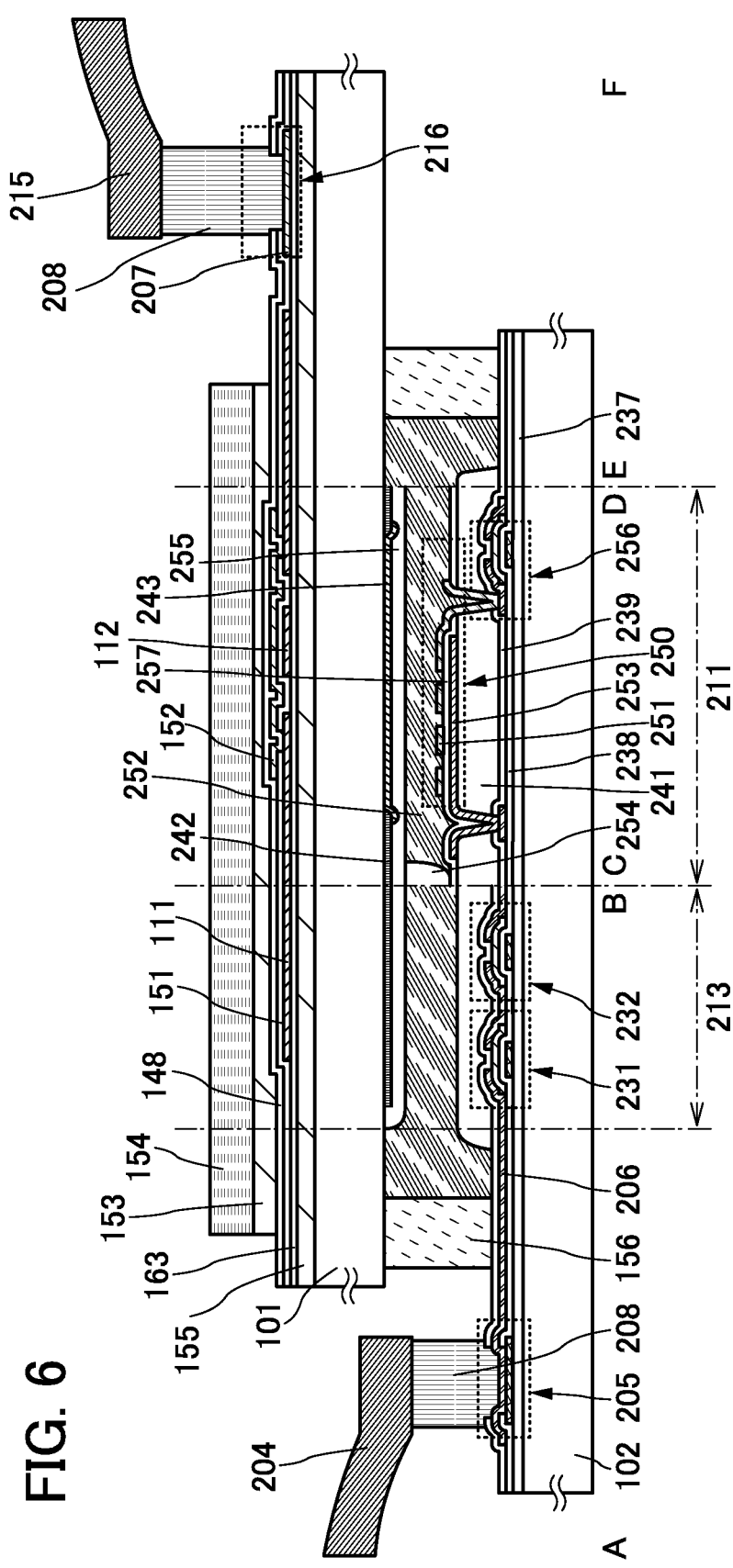
FIG. 6 illustrates a structural example of a display device in one embodiment of the present invention.

FIG. 6 is a schematic cross-sectional view of a region including the FPC 204 and the gate driver circuit 213 along the section line A-B, a region including the pixel portion 211 along the section line C-D, and a region including the FPC 215 along the section line E-F, in the display device 200 illustrated in FIG. 5A.

The first substrate 101 and the second substrate 102 are attached to each other with the sealant 156 at outer edge portions thereof. In a region surrounded by the first substrate 101, the second substrate 102, and the sealant 156, at least the pixel portion 211 is provided.

In FIG. 6, the gate driver circuit 213 includes a circuit in which n-channel transistors, transistors 231 and 232, are used in combination, as an example. Note that the gate driver circuit 213 is not limited to this structure and may include various CMOS circuits in which an n-channel transistor and a p-channel transistor are used in combination or a circuit in which p-channel transistors are used in combination. Note that the same applies to the source driver circuit 212. Although a driver-integrated structure in which the gate driver circuit 213 and the source driver circuit 212 are formed over an insulating surface provided with the display portion 201 is described in this structural example, the gate driver circuit 213 or the source driver circuit 212, or both may be formed over a surface different from the insulating surface provided with the display portion 201. For example, a driver circuit IC may be mounted by a COG method, or a flexible substrate (FPC) mounted with a driver circuit IC by a COF method may be mounted.

Note that there is no particular limitation on the structures of the transistors included in the pixel portion 211, the source driver circuit 212, and the gate driver circuit 213. For example, a forward staggered transistor or an inverted staggered transistor may be used. Further, a top-gate transistor or a bottom-gate transistor may be used. As a semiconductor material used for the transistors, for example, a semiconductor material such as silicon or germanium or an oxide semiconductor containing at least one of indium, gallium, and zinc may be used.

Further, there is no particular limitation on the crystallinity of a semiconductor used for the transistors, and an amorphous semiconductor or a semiconductor having crystallinity (a microcrystalline semiconductor, a polycrystalline semiconductor, a single crystal semiconductor, or a semiconductor partly including crystal regions) may be used. A semiconductor having crystallinity is preferably used, in which case deterioration of transistor characteristics can be reduced.

Typical examples of the oxide semiconductor containing at least one of indium, gallium, and zinc include an In—Ga—Zn-based metal oxide. An oxide semiconductor having a wider band gap and a lower carrier density than silicon is preferably used because off-state leakage current can be reduced. Details of preferred oxide semiconductors will be described below in another embodiment.

FIG. 6 shows a cross-sectional structure of one pixel as an example of the pixel portion 211. The pixel portion 211 is provided with a liquid crystal element 250 having a fringe field switching (FFS) mode. In the liquid crystal element 250, the orientation of a liquid crystal is controlled by an electric field generated in an oblique direction to the substrate surface.

One pixel includes at least one switching transistor 256 and a storage capacitor which is not illustrated. In addition, a first electrode 251 having a comb shape is provided over an insulating layer 257 so as to be electrically connected to a source electrode or a drain electrode of the transistor 256. Furthermore, a second electrode 253 is provided over an insulating layer 241 so as to be insulated from the first electrode 251 with the insulating layer 257 provided therebetween.

For the second electrode 253, or both of the first electrode 251 and the second electrode 253, a light-transmitting conductive material is used. It is preferable to use a light-transmitting conductive material for both of these electrodes because the aperture ratio of the pixel can be increased. As the light-transmitting conductive material, a conductive oxide such as indium oxide, indium tin oxide, indium zinc oxide, zinc oxide, or zinc oxide to which gallium is added, or graphene can be used.

Further, a color filter 243 and a black matrix 242 are provided on the first substrate 101 in at least a region overlapping with the pixel portion 211.

The color filter 243 is provided in order to adjust the color of light transmitted through a pixel to increase the color purity. For example, in a full-color display device using a white back light, a plurality of pixels provided with color filters of different colors are used. In that case, the color filters may be those of three colors of R (red), G (green), and B (blue) or four colors (yellow (Y) in addition to these three colors). Further, a white (W) pixel may be added to R, Q and B pixels (and a Y pixel). That is, color filters of four colors (or five colors) may be used.

Further, the black matrix 242 is provided between the adjacent color filters 243. The black matrix 242 blocks light emitted from an adjacent pixel, thereby preventing color mixture between the adjacent pixels. In one configuration, the black matrix 242 may be provided only between adjacent pixels of different emission colors and not between pixels of the same emission color. When the color filter 243 is provided so that its end portion overlaps with the black matrix 242, light leakage can be reduced. The black matrix 242 can be formed using a material that blocks light passing through a pixel, for example, a metal material, a resin material including a pigment, or the like. Note that it is preferable to provide the black matrix 242 also in a region overlapping with the gate driver circuit 213 or the like, which is not the pixel portion 211, as illustrated in FIG. 6, because undesired leakage of guided light or the like can be prevented.

An overcoat 255 is provided so as to cover the color filter 243 and the black matrix 242. The overcoat 255 can suppress diffusion of impurities such as a pigment, which are included in the color filter 243 and the black matrix 242, into a liquid crystal 252. For the overcoat, a light-transmitting material is used, and an inorganic insulating material or an organic insulating material can be used.

Further, a structure including the color filter 243, the black matrix 242, and the overcoat 255 corresponds to the color filter layer 105.

In addition, a spacer 254 is provided in a region where the overcoat 255 overlaps with the black matrix 242. The spacer 254 is preferably formed using a resin material because it can be formed thick. For example, the spacer 254 can be formed using a positive or negative photosensitive resin. When a light-blocking material is used for the spacer 254, the spacer 254 blocks light emitted from an adjacent pixel, thereby preventing color mixture between the adjacent pixels. Note that although the spacer 254 is provided on the first substrate 101 side in this structural example, it may be provided on the second substrate 102 side. Further, a structure may be employed in which spherical silicon oxide particles are used as the spacer 254 and the particles are scattered in a region where the liquid crystal 252 is provided.

The liquid crystal 252 is sealed at least in a region where the first electrode 251 and the second electrode 253 are provided. Here, the first electrode 251, the second electrode 253, and the liquid crystal 252 form the liquid crystal element 250.

An image can be displayed in the following way: an electric field is generated in the oblique direction by application of voltage between the first electrode 251 and the second electrode 253, orientation of the liquid crystal 252 is controlled by the electric field, and polarization of light from a backlight provided outside the display device is controlled in each pixel.

An alignment film that controls orientation of the liquid crystal 252 may be provided on a surface in contact with the liquid crystal 252. A light-transmitting material is used for the alignment film. Although not illustrated here, a polarizing plate is provided outside the second substrate 102 with respect to the liquid crystal element 250. Moreover, a light guide plate may be used so that light from the backlight enters through a side surface of the display device.

In this structural example, a color filter is provided in a region overlapping with the liquid crystal element 250; thus, a full-color image can be displayed using a backlight that emits white light. With the use of a plurality of light-emitting diodes (LEDs) which emit light of different colors as a backlight, a time-division display method (a field-sequential driving method) can be employed. In the case of employing a time-division display method, the aperture ratio of each pixel or the number of pixels per unit area can be increased because neither color filters nor subpixels from which light of red (R), green (G), or blue (B), for example, is obtained are needed.

As the liquid crystal 252, a thermotropic liquid crystal, a low molecular liquid crystal, a polymer liquid crystal, a ferroelectric liquid crystal, an anti-ferroelectric liquid crystal, or the like can be used. Moreover, a liquid crystal exhibiting a blue phase is preferably used because an alignment film is not necessary and the viewing angle is wide.

Although the liquid crystal element 250 having an FFS mode is described in this structural example, the structure of the liquid crystal element is not limited to this example, and the liquid crystal element 250 using a different mode can be used. For example, an in-plane-switching (IPS) mode, a twisted nematic (TN) mode, a vertical alignment (VA) mode, an axially symmetric aligned micro-cell (ASM) mode, an optically compensated birefringence (OCB) mode, a ferroelectric liquid crystal (FLC) mode, an antiferroelectric liquid crystal (AFLC) mode, or the like can be used.

Here, the light-emitting element 250 preferably uses the IPS mode or the FFS mode. A liquid crystal element using such a mode does not require an electrode to be provided on the first substrate 101 side. Thus, it is possible to reduce the influence of parasitic capacitance generated between an electrode of the touch sensor provided on the first substrate 101 side and the electrode of the liquid crystal element, thereby improving the sensitivity of the touch sensor.

An insulating layer 237 in contact with an upper surface of the second substrate 102, an insulating layer 238 functioning as a gate insulating layer of transistors, and insulating layers 239 and 241 covering the transistors are provided over the second substrate 102.

The insulating layer 237 is provided in order to prevent diffusion of impurities included in the second substrate 102. The insulating layers 238 and 239, which are in contact with semiconductor layers of the transistors, are preferably formed using a material which prevents diffusion of impurities that promote degradation of the transistors. For these insulating layers, for example, an oxide, a nitride, or an oxynitride of a semiconductor such as silicon or a metal such as aluminum can be used. Alternatively, a stack of such inorganic insulating materials or a stack of such an inorganic insulating material and an organic insulating material may be used. Note that the insulating layers 237 and 239 are not necessarily provided when not needed.

The insulating layer 241 functions as a planarization layer which covers steps due to the transistors, a wiring, or the like provided therebelow. For the insulating layer 241, it is preferable to use a resin material such as polyimide or acrylic. An inorganic insulating material may be used as long as high planarity can be obtained. Note that the insulating layer 241 is not necessarily provided.

Here, a structure excluding the first electrode 251 and the second electrode 253 from the stacked structure including the insulating layer 237 to the insulating layer 257 corresponds to the TFT layer 107.

The electrode 111, the electrode 112, the insulating layer 151, and the wiring 152 which form the touch sensor 202 are provided over a surface of the first substrate 101 which is opposite to a surface of the first substrate 101 facing the liquid crystal element 250. Here, a structure including the electrode 111, the electrode 112, the insulating layer 151, and the wiring 152 corresponds to the sensor layer 103.

For the electrode 111 and the electrode 112, any of the above-described light-transmitting conductive materials can be used. For the wiring 152, other than a light-transmitting conductive material similar to that used for the above electrodes, a metal material such as aluminum, gold, platinum, silver, nickel, tungsten, chromium, molybdenum, iron, cobalt, copper, or palladium or an alloy material containing any of these metal materials can be used.

Further, an insulating layer 148 is provided over the wiring 152. The insulating layer 148 can be formed using an inorganic insulating material, for example. Note that the insulating layer 148 is not necessarily provided.

The polarizing plate 154 is provided over the insulating layer 148 with the bonding layer 153 interposed therebetween.

The wiring 206 provided over the second substrate 102 is provided so as to extend to the outside of the region sealed with the sealant 156 and is electrically connected to the gate driver circuit 213 (or the source driver circuit 212). Part of an end portion of the wiring 206 forms part of the external connection electrode 205. In this structural example, the external connection electrode 205 is formed by a stack of a conductive film used for the source electrode and the drain electrode of the transistor and a conductive film used for the gate electrode of the transistor. The external connection electrode 205 is preferably formed by a stack of a plurality of conductive films as described above because mechanical strength against a pressure bonding step performed on the FPC 204 or the like can be increased.

A connection layer 208 is provided in contact with the external connection electrode 205. The FPC 204 is electrically connected to the external connection electrode 205 through the connection layer 208. For the connection layer 208, a known anisotropic conductive film, a known anisotropic conductive paste, or the like can be used.

Further, the wiring 207 provided over the first substrate 101 is electrically connected to the electrode 111 (or the electrode 112) of the touch sensor 202. Part of an end portion of the wiring 207 forms the external connection electrode 216. The external connection electrode 216 is electrically connected to the FPC 215 through the connection layer 208 as in the case of the wiring 206.

The end portions of the wiring 206, the wiring 207, the external connection electrode 205, and the external connection electrode 216 are preferably covered with an insulating layer so that surfaces thereof are not exposed because oxidation of the surfaces and defects such as unintentional short-circuit can be suppressed.

Note that the positions where the FPCs are connected are not limited to those illustrated in FIGS. 5A and 5B. For example, the external connection electrodes may be formed so that the FPC 204 and the FPC 215 overlap with each other by changing the layout of the wirings.

The above is the description of this structural example. With such a structure, a thinned display device with a touch sensor can be achieved.

Modification Example

An example of using a liquid crystal element having a VA mode in the above-described cross-sectional structural example 1 is described below.

Figure 7:
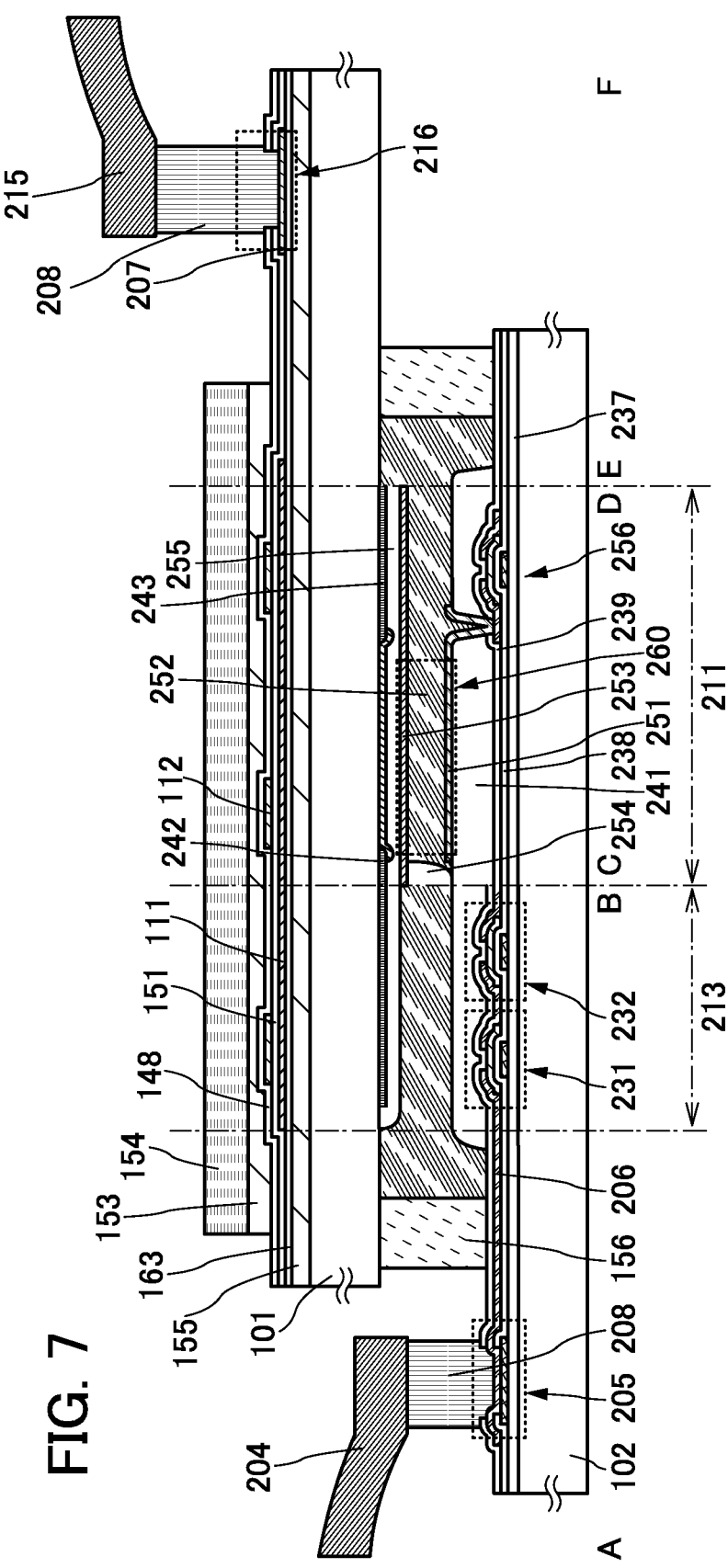
FIG. 7 illustrates a structural example of a display device in one embodiment of the present invention.

FIG. 7 is a schematic cross-sectional view of a display device described in this modification example. The display device illustrated in FIG. 7 is different from the cross-sectional structural example 1 in that a structure of a liquid crystal element of the display device is different.

A liquid crystal element 260 provided for a pixel includes the first electrode 251 provided over the insulating layer 241 on the second substrate 102 side, the second electrode 253 provided on the overcoat 255 on the first substrate 101 side, and the liquid crystal 252 sandwiched between the first electrode 251 and the second electrode 253.

Further, the electrode 111, the insulating layer 151, and the electrode 112 which form the touch sensor 202 are provided over a surface of the first substrate 101 which is opposite to a surface of the first substrate 101 facing the liquid crystal element 260. Here, a structure including the electrode 111, the insulating layer 151, and the electrode 112 corresponds to the sensor layer 103. FIG. 7 illustrates an example of a structure of the touch sensor 202 in which the electrode 111 overlaps with the electrode 112 with the insulating layer 151 interposed therebetween.

In the structure described in this embodiment, the touch sensor 202 is provided outside the first substrate 101 (over the surface of the first substrate 101 which is opposite to the surface of the first substrate 101 facing the liquid crystal element 260), whereby a distance between the electrode included in the liquid crystal element 260 (the second electrode 253 and/or the first electrode 251) and the electrode included in the touch sensor 202 (the electrode 111 and/or the electrode 112) can be secured sufficiently. Accordingly, parasitic capacitance between the electrodes can be reduced, and thus high sensitivity of the touch sensor 202 can be achieved even in the case of the display device using a liquid crystal element having a VA mode in which a distance between the electrodes is smaller than that in a FFS mode.

The above is the description of this modification example.

Cross-Sectional Structural Example 2

A cross-sectional structural example of a display device in which an organic EL element is used in the display portion 201 is described below. Note that description of the same portions as those in the cross-sectional structural example 1 is skipped or simplified in some cases.

Figure 8:
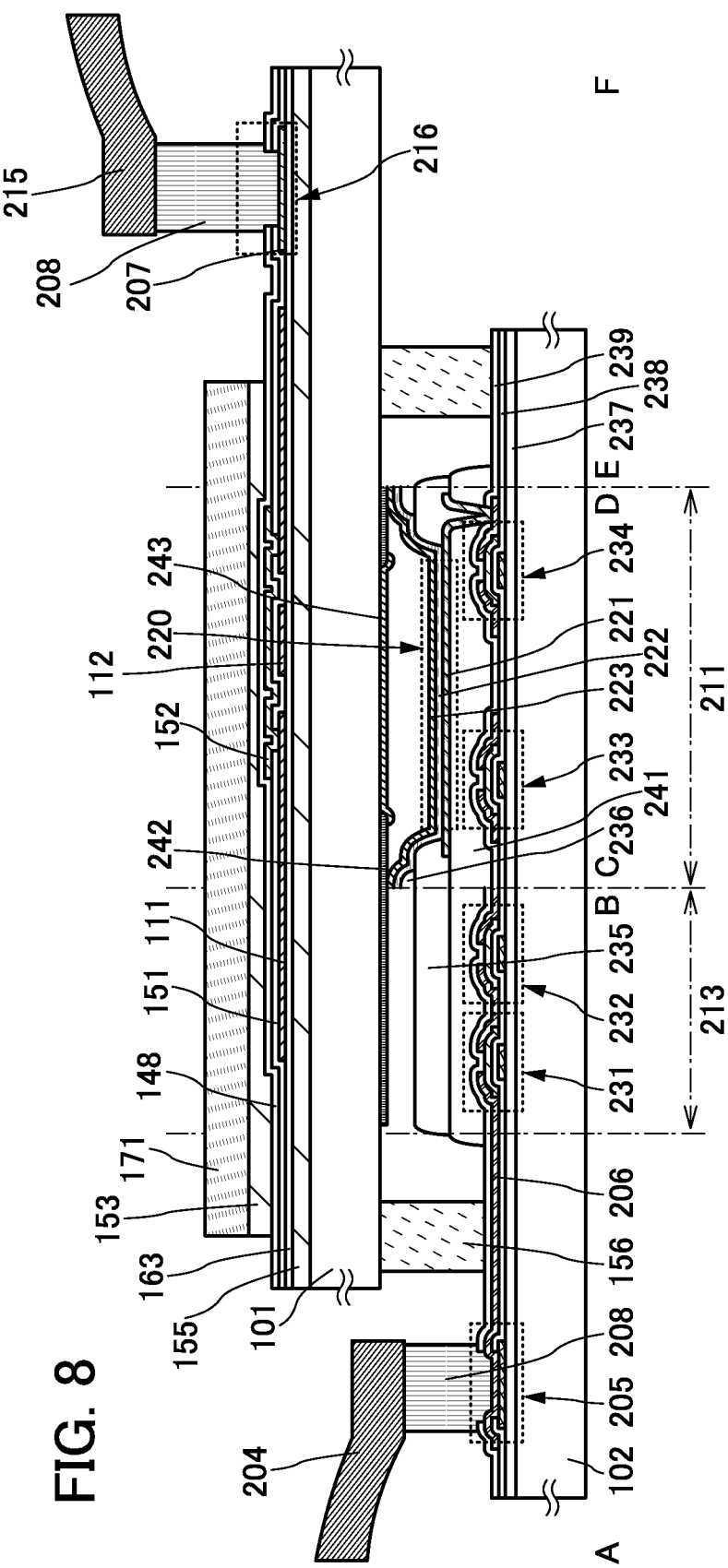
FIG. 8 illustrates a structural example of a display device in one embodiment of the present invention.

FIG. 8 is a schematic cross-sectional view of a display device described as an example in this structural example. The display device illustrated in FIG. 8 is different from the above-described structural example 1 mainly in the structure of the pixel portion 211.

One pixel in the pixel portion 211 includes a switching transistor 233, a current control transistor 234, and a first electrode 221 that is electrically connected to one electrode (a source electrode or a drain electrode) of the transistor 234. An insulating layer 235 is provided so as to cover an end portion of the first electrode 221, and a spacer 236 is provided in a region which is over the insulating layer 235 and overlaps with a black matrix 242. When a plurality of spacers 236 is provided in the pixel portion 211, the first substrate 101 and the second substrate 102 can be prevented from getting unnecessarily close to each other, and the display device can have high reliability.

Although the spacer 236 is provided on the second substrate 102 side in FIG. 8, the spacer 236 may be provided on the first substrate 101 side as in the above-described cross-sectional structural example. Further, when a surface of the spacer 236 has conductivity and the surface of the spacer 236 is provided in contact with the second electrode 223 of the light-emitting element 220, the spacer 236 can also be used as an auxiliary wiring which is electrically connected to the second electrode 223. In particular, the spacer 236 serving as an auxiliary wiring is effective in the case of using a light-transmitting conductive material having relatively high resistivity for the second electrode 223. Even in the case where the first substrate 101 is provided with a component such as the spacer or the auxiliary wiring, by the method for manufacturing a display device of one embodiment of the present invention, a highly reliable display device can be achieved without the component being damaged.

The light-emitting element 220 includes the first electrode 221, the second electrode 223, and an EL layer 222 provided between the first electrode 221 and the second electrode 223. The light-emitting element 220 is described below.

In the light-emitting element 220, a light-transmitting material that transmits light emitted from the EL layer 222 is used for an electrode provided on the light exit side.

As the light-transmitting material, other than the above-described conductive oxide and graphene, a metal material such as gold, silver, platinum, magnesium, nickel, tungsten, chromium, molybdenum, iron, cobalt, copper, palladium, or titanium or an alloy material containing any of these metal materials can be used. Alternatively, a nitride of the metal material (e.g., titanium nitride) or the like may be used. In the case of using the metal material or the alloy material (or the nitride thereof), the thickness is set small enough to be able to transmit light. Alternatively, a stack of any of the above materials can be used as the conductive layer. For example, a stacked film of indium tin oxide and an alloy of silver and magnesium is preferably used because the conductivity can be increased.

Such an electrode is formed by an evaporation method, a sputtering method, or the like. A discharging method such as an ink-jet method, a printing method such as a screen printing method, or a plating method may be used.

Note that when the above conductive oxide having a light-transmitting property is formed by a sputtering method, the use of a deposition atmosphere containing argon and oxygen allows the light-transmitting property to be increased.

Further, in the case where a film of the conductive oxide is formed over the EL layer 222, it is preferable to stack a first conductive oxide film formed under an atmosphere containing argon with reduced oxygen concentration and a second conductive oxide film formed under an atmosphere containing argon and oxygen, in which case damage to the EL layer 222 due to film formation can be reduced. Here, the purity of an argon gas used for formation of the first conductive oxide film is preferably high, and for example, it is preferable to use the argon gas whose dew point is lower than or equal to −70° C., more preferably lower than or equal to −100° C.

For an electrode provided on a side opposite to the light exit side, a reflective material which reflects the light emission is used.

As a light reflective material, a metal material such as aluminum, gold, platinum, silver, nickel, tungsten, chromium, molybdenum, iron, cobalt, copper, or palladium or an alloy material containing any of these metal materials can be used. Alternatively, lanthanum, neodymium, germanium, or the like may be added to any of the above metal materials or the alloy materials. Examples of alloy materials include alloys containing aluminum (aluminum alloys) such as an alloy of aluminum and titanium, an alloy of aluminum and nickel, and an alloy of aluminum and neodymium, alloys containing silver such as an alloy of silver and copper, an alloy of silver, palladium, and copper, and an alloy of silver and magnesium, and the like. An alloy of silver and copper is preferable because of its high heat resistance. Further, when a metal film or a metal oxide film is stacked to be in contact with a film containing aluminum, oxidation of the film containing aluminum can be suppressed. As examples of the metal material or the metal oxide material in contact with the film containing aluminum, titanium and titanium oxide can be given. Further alternatively, a stack of a film containing any of the above light-transmitting materials and a film containing any of the above metal materials may be used. For example, a stack of silver and indium tin oxide, a stack of an alloy of silver and magnesium and indium tin oxide, or the like can be used.

Such an electrode is formed by an evaporation method, a sputtering method, or the like. A discharging method such as an ink-jet method, a printing method such as a screen printing method, or a plating method may be used.

The EL layer 222 includes at least a layer containing a light-emitting organic compound (hereinafter also referred to as a light-emitting layer), and may be either a single layer or a stack of plural layers. As the structure in which a plurality of layers is stacked, a structure in which an anode, a hole injection layer, a hole transport layer, a light-emitting layer, an electron transport layer, and an electron injection layer are stacked in this order can be given as an example. Note that not all of these layers except the light-emitting layer are necessarily provided in the EL layer 222. Further, each of these layers may be provided in duplicate or more. Specifically, in the EL layer 222, a plurality of light-emitting layers may be stacked. Furthermore, another component such as a charge-generation region may be added as appropriate. Alternatively, a plurality of light-emitting layers exhibiting different colors may be stacked each other. For example, a white emission can be obtained by stacking two or more light-emitting layers of complementary colors.

The EL layer 222 can be formed by a vacuum evaporation method, a discharging method such as an ink-jet method or a dispensing method, a coating method such as a spin-coating method, a printing method, or the like.

In this embodiment, a reflective material is used for the first electrode 221, and a light-transmitting material is used for the second electrode 223. Thus, the light-emitting element 220 is a top-emission light-emitting element, and emits light to the first substrate 101 side.

The above is the description of the light-emitting element 220.

Here, a structure excluding the first electrode 221 from the stacked structure including the insulating layer 238 to the spacer 236 corresponds to the TFT layer 107.

Further, in FIG. 8, each of the insulating layer 235 and the insulating layer 241 which is formed using an organic insulating material, and is processed into an island shape on an inner side than the sealant 156 and not in contact with the sealant 156. When the layers containing an organic material are provided so as not to be in contact with the sealant 156 or so as not to extend outside the sealant 156, an impurity such as moisture can be prevented from diffusing into the light-emitting element 220 or the transistors through the layers containing an organic material. In the case of using an oxide semiconductor for a transistor, entry of moisture can be effectively blocked.

When the layers containing an organic material are not in contact with the sealant 156 as illustrated in FIG. 8, for the sealant 156, a material containing a glass material, such as a glass body formed by melting and solidifying powder glass (also called frit glass), can be used. Such a material can effectively suppress permeation of moisture and gas and can therefore suppress the deterioration of the light-emitting element 220. Thus, the display device can have very high reliability.

Further, in the display device illustrated in FIG. 8, the electrode 111, the electrode 112, the insulating layer 151, and the wiring 152 which form the touch sensor 202 are provided over a surface of the first substrate 101 which is opposite to a surface of the first substrate 101 facing the light-emitting element 220, as in the structural example 1 and the modification example. Further, the insulating layer 148 is provided over the wiring 152. An optical film such as a circularly polarizing plate 171 (including an elliptically polarizing plate) is formed over the insulating layer 148 with the bonding layer 153 interposed therebetween. When the circularly polarizing plate 171 is provided, contrast of the pixel portion 211 can be improved.

The above is the description of this structural example. With such a structure, a thinned and light-weight display device including a touch sensor with high sensitivity can be achieved.

This embodiment can be combined with any of the other embodiments disclosed in this specification as appropriate.

Embodiment 3

An example of a semiconductor which is preferably used for the region in the transistor where a channel is formed which is exemplified in the above embodiment is described below.

An oxide semiconductor has a wide energy gap of 3.0 eV or more. A transistor including an oxide semiconductor film obtained by processing of the oxide semiconductor in an appropriate condition and a sufficient reduction in carrier density of the oxide semiconductor can have much lower leakage current between a source and a drain in an off state (off-state current) than a conventional transistor including silicon.

In the case of using an oxide semiconductor film for the transistor, the thickness of the oxide semiconductor film is preferably greater than or equal to 2 nm and less than or equal to 40 nm.

An applicable oxide semiconductor preferably contains at least indium (In) or zinc (Zn). In particular, In and Zn are preferably contained. In addition, as a stabilizer for reducing variation in electric characteristics of the transistor using the oxide semiconductor, one or more selected from gallium (Ga), tin (Sn), hafnium (HO, zirconium (Zr), titanium (Ti), scandium (Sc), yttrium (Y), and an lanthanoid (such as cerium (Ce), neodymium (Nd), or gadolinium (Gd), for example) is preferably contained.

As the oxide semiconductor, for example, any of the following can be used: indium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—Zr—Zn-based oxide, an In—Ti—Zn-based oxide, an In—Sc—Zn-based oxide, an In—Y—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide.

Here, an "In—Ga—Zn-based oxide" means an oxide containing In, Ga, and Zn as its main components and there is no particular limitation on the ratio of In:Ga:Zn. The In—Ga—Zn-based oxide may contain a metal element other than the In, Ga, and Zn.

Alternatively, a material represented by $InMO_3(ZnO)_m$ (m>0 is satisfied, and m is not an integer) may be used as an oxide semiconductor. Note that M represents one or more metal elements selected from Ga, Fe, Mn, and Co, or the above-described element as a stabilizer. Alternatively, as the oxide semiconductor, a material expressed by a chemical formula, $In_2SnO_5(ZnO)_n$ (n>0, n is an integer) may be used.

For example, an In—Ga—Zn-based oxide with an atomic ratio of In:Ga:Zn=1:1:1, In:Ga:Zn=3:1:2, or In:Ga:Zn=2:1:3, or an oxide with an atomic ratio close to the above atomic ratios can be used.

Further, when the oxide semiconductor film contains a large amount of hydrogen, the hydrogen and an oxide semiconductor are bonded to each other, so that part of the hydrogen serves as a donor and causes generation of an electron which is a carrier. As a result, the threshold voltage of the transistor shifts in the negative direction. Therefore, it is preferable that, after formation of the oxide semiconductor film, dehydration treatment (dehydrogenation treatment) be performed to remove hydrogen or moisture from the oxide semiconductor film so that the oxide semiconductor film is highly purified to contain impurities as little as possible.

Note that oxygen in the oxide semiconductor film is also reduced by the dehydration treatment (dehydrogenation treatment) in some cases. Accordingly, it is preferable that oxygen be added to the oxide semiconductor film to fill oxygen vacancies increased by the dehydration treatment (dehydrogenation treatment). In this specification and the like, supplying oxygen to an oxide semiconductor film may be expressed as oxygen adding treatment, or treatment for making the oxygen content of an oxide semiconductor film be in excess of that of the stoichiometric composition may be expressed as treatment for making an oxygen-excess state.

In this manner, hydrogen or moisture is removed from the oxide semiconductor film by the dehydration treatment (dehydrogenation treatment) and oxygen vacancies therein are filled by the oxygen adding treatment, whereby the oxide semiconductor film can be turned into an i-type (intrinsic) or substantially i-type (intrinsic) oxide semiconductor film which is extremely close to an i-type oxide semiconductor film. Note that "substantially intrinsic" means that the oxide semiconductor film contains extremely few (close to zero) carriers derived from a donor and has a carrier density of lower than or equal to $1\times10^{17}/cm^3$, lower than or equal to $1\times10^{16}/cm^3$, lower than or equal to $1\times10^{15}/cm^3$, lower than or equal to $1\times10^{14}/cm^3$, or lower than or equal to $1\times10^{13}/cm^3$.

Thus, the transistor including an i-type or substantially i-type oxide semiconductor film can have extremely favorable off-state current characteristics. For example, the drain current when the transistor including an oxide semiconductor film is in an off state can be less than or equal to $1\times10^{-18}$ A, preferably less than or equal to $1\times10^{-21}$ A, more preferably less than or equal to $1\times10^{-24}$ A at room temperature (approximately 25° C.), or the drain current can be less than or equal to $1\times10^{-15}$ A, preferably less than or equal to $1\times10^{-18}$ A, more preferably less than or equal to $1\times10^{-21}$ A at 85° C. Note that an off state of a transistor refers to a state where gate voltage is sufficiently lower than threshold voltage in the case of an n-channel transistor. Specifically, when the gate voltage is lower than the threshold voltage by 1 V or more, 2 V or more, or 3 V or more, the transistor is turned off.

A structure of an oxide semiconductor film is described below.

An oxide semiconductor film is classified roughly into a single-crystal oxide semiconductor film and a non-single-crystal oxide semiconductor film. The non-single-crystal oxide semiconductor film includes any of a c-axis aligned crystalline oxide semiconductor (CAAC-OS) film, a polycrystalline oxide semiconductor film, a microcrystalline oxide semiconductor film, an amorphous oxide semiconductor film, and the like.

First, a CAAC-OS film will be described.

The CAAC-OS film is one of oxide semiconductor films having a plurality of c-axis aligned crystal parts.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction substantially parallel to a sample surface (cross-sectional TEM image), metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film.

On the other hand, according to the TEM image of the CAAC-OS film observed in a direction substantially perpendicular to the sample surface (plan TEM image), metal atoms are arranged in a triangular or hexagonal configuration in the crystal parts. However, there is no regularity of arrangement of metal atoms between different crystal parts.

From the results of the cross-sectional TEM image and the plan TEM image, alignment is found in the crystal parts in the CAAC-OS film.

Most of the crystal parts included in the CAAC-OS film each fit inside a cube whose one side is less than 100 nm. Thus, there is a case where a crystal part included in the CAAC-OS film fits a cube whose one side is less than 10 nm, less than 5 nm, or less than 3 nm. Note that when a plurality of crystal parts included in the CAAC-OS film are connected to each other, one large crystal region is formed in some cases. For example, a crystal region with an area of 2500 $nm^2$ or more, 5 $\mu m^2$ or more, or 1000 $\mu m^2$ or more is observed in some cases in the plan TEM image.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears when the diffraction angle (2θ) is around 31° in some cases. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray enters a sample in a direction perpendicular to the c-axis, a peak appears frequently when 2θ is around 56°. This peak is derived from the (110) plane of the $InGaZnO_4$ crystal. Here, analysis (φ scan) is performed under conditions where the sample is rotated around a normal vector of a sample surface as an axis (φ axis) with 2θ fixed at around 56°. In the case where the sample is a single-crystal oxide semiconductor film of $InGaZnO_4$, six peaks appear. The six peaks are derived from crystal planes equivalent to the (110) plane. On the other hand, in the case of a CAAC-OS film, a peak is not clearly observed even when θ scan is performed with 2θ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned with a direction parallel to a normal vector of a formation surface or a normal vector of a top surface. Thus, for example, in the case where a shape of the CAAC-OS film is changed by etching or the like, the c-axis might not be necessarily parallel to a normal vector of a formation surface or a normal vector of a top surface of the CAAC-OS film.

Further, distribution of c-axis aligned crystal parts in the CAAC-OS film is not necessarily uniform. For example, in the case where crystal growth leading to the crystal parts of the CAAC-OS film occurs from the vicinity of the top surface of the film, the proportion of the c-axis aligned crystal parts in the vicinity of the top surface is higher than that in the vicinity of the formation surface in some cases. Further, when an impurity is added to the CAAC-OS film, a region to which the impurity is added is altered, and the proportion of the c-axis aligned crystal parts in the CAAC-OS film varies depending on regions, in some cases.

Note that when the CAAC-OS film with an $InGaZnO_4$ crystal is analyzed by an out-of-plane method, a peak of $2\theta$ may also be observed at around 36°, in addition to the peak of $2\theta$ at around 31°. The peak of $2\theta$ at around 36° indicates that a crystal having no c-axis alignment is included in part of the CAAC-OS film. It is preferable that in the CAAC-OS film, a peak of $2\theta$ appear at around 31° and a peak of $2\theta$ do not appear at around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Further, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Electric charge trapped by the carrier traps in the oxide semiconductor film takes a long time to be released, and might behave like fixed electric charge. Thus, the transistor which includes the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Next, a microcrystalline oxide semiconductor film will be described.

In an image obtained with the TEM, crystal parts cannot be found clearly in the microcrystalline oxide semiconductor in some cases. In most cases, a crystal part in the microcrystalline oxide semiconductor is greater than or equal to 1 nm and less than or equal to 100 nm, or greater than or equal to 1 nm and less than or equal to 10 nm. A microcrystal with a size greater than or equal to 1 nm and less than or equal to 10 nm, or a size greater than or equal to 1 nm and less than or equal to 3 nm is specifically referred to as nanocrystal (nc). An oxide semiconductor film including nanocrystal is referred to as an nc-OS (nanocrystalline oxide semiconductor) film. In an image obtained with TEM, a crystal grain cannot be found clearly in the nc-OS film in some cases.

In the nc-OS film, a microscopic region (for example, a region with a size greater than or equal to 1 nm and less than or equal to 10 nm, in particular, a region with a size greater than or equal to 1 nm and less than or equal to 3 nm) has a periodic atomic order. Further, there is no regularity of crystal orientation between different crystal parts in the nc-OS film; thus, the orientation of the whole film is not observed. Accordingly, in some cases, the nc-OS film cannot be distinguished from an amorphous oxide semiconductor depending on an analysis method. For example, when the nc-OS film is subjected to structural analysis by an out-of-plane method with an XRD apparatus using an X-ray having a diameter larger than that of a crystal part, a peak which shows a crystal plane does not appear. Further, a halo pattern is shown in a selected-area electron diffraction pattern of the nc-OS film obtained by using an electron beam having a probe diameter (e.g., larger than or equal to 50 nm) larger than that of a crystal part. Meanwhile, spots are shown in a nanobeam electron diffraction pattern of the nc-OS film obtained by using an electron beam having a probe diameter (e.g., larger than or equal to 1 nm and smaller than or equal to 30 nm) close to, or smaller than or equal to that of a crystal part. Further, in a nanobeam electron diffraction pattern of the nc-OS film, regions with high luminance in a circular (ring) pattern are shown in some cases. Also in a nanobeam electron diffraction pattern of the nc-OS film, a plurality of spots are shown in a ring-like region in some cases.

Since the nc-OS film is an oxide semiconductor film having more regularity than the amorphous oxide semiconductor film, the nc-OS film has a lower density of defect states than the amorphous oxide semiconductor film. However, there is no regularity of crystal orientation between different crystal parts in the nc-OS film; hence, the nc-OS film has a higher density of defect states than the CAAC-OS film.

Note that an oxide semiconductor film may be a stacked film including two or more films of an amorphous oxide semiconductor film, a microcrystalline oxide semiconductor film, and a CAAC-OS film, for example.

By reducing the mixing of impurities during the deposition, the crystal state can be prevented from being broken by the impurities. For example, the concentration of impurities (e.g., hydrogen, water, carbon dioxide, or nitrogen) which exist in the deposition chamber may be reduced. Furthermore, the concentration of impurities in a deposition gas may be reduced. Specifically, a deposition gas whose dew point is −80° C. or lower, preferably −100° C. or lower is used.

Furthermore, it is preferable that the proportion of oxygen in the deposition gas be increased and the power be optimized in order to reduce plasma damage at the deposition. The proportion of oxygen in the deposition gas is 30 vol. % or higher, preferably 100 vol. %.

After the CAAC-OS film is deposited, heat treatment may be performed. The temperature of the heat treatment is higher than or equal to 100° C. and lower than or equal to 740° C., preferably higher than or equal to 200° C. and lower than or equal to 500° C. Further, the heat treatment is performed for 1 minute to 24 hours, preferably 6 minutes to 4 hours. Further, the heat treatment may be performed in an inert atmosphere or an oxidation atmosphere. It is preferable to perform heat treatment in an inert atmosphere and then to perform heat treatment in an oxidation atmosphere. The heat treatment in an inert atmosphere can reduce the concentration of impurities in the CAAC-OS film for a short time. At the same time, the heat treatment in an inert atmosphere may generate oxygen vacancies in the CAAC-OS film. In this case, the heat treatment in an oxidation atmosphere can reduce the oxygen vacancies. The heat treatment can further increase the crystallinity of the CAAC-OS film. Note that the heat treatment may be performed under a reduced pressure, such as 1000 Pa or lower, 100 Pa or lower, 10 Pa or lower, or 1 Pa or lower. The heat treatment under the reduced atmosphere can reduce the concentration of impurities in the CAAC-OS film for a shorter time.

As an example of the sputtering target, an In—Ga—Zn—O compound target is described below.

The In—Ga—Zn—O compound target, which is polycrystalline, is made by mixing $InO_X$ powder, $GaO_Y$ powder, and $ZnO_Z$ powder in a predetermined molar ratio, applying pressure, and performing heat treatment at a temperature higher than or equal to 1000° C. and lower than or equal to 1500° C. Note that X, Y, and Z are each a given positive number. Here, the predetermined molar ratio of $InO_X$ powder to $GaO_Y$ powder and $ZnO_Z$ powder is, for example, 1:1:1, 1:1:2, 1:3:2, 2:1:3, 2:2:1, 3:1:1, 3:1:2, 3:1:4, 4:2:3, 8:4:3, or a ratio close to these ratios. The kinds of powder and the molar ratio for mixing powder may be determined as appropriate depending on the desired sputtering target.

Alternatively, the CAAC-OS film may be formed by the following method.

First, a first oxide semiconductor film is formed to a thickness of greater than or equal to 1 nm and less than 10 nm. The first oxide semiconductor film is formed by a sputtering method. Specifically, the first oxide semiconductor film is formed under conditions that a substrate temperature is higher than or equal to 100° C. and lower than or equal to 500° C., preferably higher than or equal to 150° C. and lower than or equal to 450° C., and the proportion of oxygen in a deposition gas is higher than or equal to 30 vol. %, preferably 100 vol. %.

Next, the first oxide semiconductor film is subjected to heat treatment to be a first CAAC-OS film having high crystallinity. The heat treatment is performed at a temperature higher than or equal to 350° C. and lower than or equal to 740° C., preferably higher than or equal to 450° C. and lower than or equal to 650° C. Further, the heat treatment is performed for 1 minute to 24 hours, preferably 6 minutes to 4 hours. The heat treatment may be performed in an inert atmosphere or an oxidation atmosphere. It is preferable to perform heat treatment in an inert atmosphere and then to perform heat treatment in an oxidation atmosphere. The heat treatment in an inert atmosphere can reduce the concentration of impurities in the first oxide semiconductor film in a short time. Meanwhile, through the heat treatment in an inert atmosphere, oxygen vacancies are generated in the first oxide semiconductor film in some cases. In this case, the heat treatment in an oxidation atmosphere can reduce the oxygen vacancies. Note that the heat treatment may be performed under a reduced pressure, such as 1000 Pa or lower, 100 Pa or lower, 10 Pa or lower, or 1 Pa or lower. The heat treatment under the reduced pressure can reduce the concentration of impurities in the first oxide semiconductor film in a shorter time.

Since the thickness of the first oxide semiconductor film is greater than or equal to 1 nm and less than 10 nm, the first oxide semiconductor film can be crystallized by heat treatment easily as compared to the case where the thickness of the first oxide semiconductor film is greater than or equal to 10 nm.

Next, a second oxide semiconductor film having the same composition as the first oxide semiconductor film is formed to a thickness of greater than or equal to 10 nm and less than or equal to 50 nm. The second oxide semiconductor film is formed by a sputtering method. Specifically, the second oxide semiconductor film is formed under conditions that a substrate temperature is higher than or equal to 100° C. and lower than or equal to 500° C., preferably higher than or equal to 150° C. and lower than or equal to 450° C., and the proportion of oxygen in a deposition gas is higher than or equal to 30 vol. %, preferably 100 vol. %.

Next, heat treatment is performed so that solid phase growth of the second oxide semiconductor film from the first CAAC-OS film occurs, whereby the second oxide semiconductor film is turned into a second CAAC-OS film having high crystallinity. The heat treatment is performed at a temperature higher than or equal to 350° C. and lower than or equal to 740° C., preferably higher than or equal to 450° C. and lower than or equal to 650° C. Further, the heat treatment is performed for 1 minute to 24 hours, preferably 6 minutes to 4 hours. The heat treatment may be performed in an inert atmosphere or an oxidation atmosphere. It is preferable to perform heat treatment in an inert atmosphere and then to perform heat treatment in an oxidation atmosphere. The heat treatment in an inert atmosphere can reduce the concentration of impurities in the second oxide semiconductor film in a short time. Meanwhile, through the heat treatment in an inert atmosphere, oxygen vacancies are generated in the second oxide semiconductor film in some cases. In this case, the heat treatment in an oxidation atmosphere can reduce the oxygen vacancies. Note that the heat treatment may be performed under a reduced pressure, such as 1000 Pa or lower, 100 Pa or lower, 10 Pa or lower, or 1 Pa or lower. The heat treatment under the reduced pressure can reduce the concentration of impurities in the second oxide semiconductor film in a shorter time.

In the above-described manner, a CAAC-OS film having a total thickness of 10 nm or more can be formed.

Further, the oxide semiconductor film may have a structure in which a plurality of oxide semiconductor films is stacked.

For example, a structure may be employed in which, between an oxide semiconductor film (referred to as a first layer for convenience) and a gate insulating film, an oxide semiconductor film (referred to as a second layer for convenience) which is formed using the constituent element of the first layer and has lower electron affinity than the first layer by 0.2 eV or more is provided. In this case, when an electric field is applied from a gate electrode, a channel is formed in the first layer, and a channel is not formed in the second layer. The constituent element of the first layer is the same as the constituent element of the second layer, and thus interface scattering hardly occurs at an interface between the first layer and the second layer. Accordingly, when the second layer is provided between the first layer and the gate insulating film, the field-effect mobility of the transistor can be increased.

Further, in the case of using a silicon oxide film, a silicon oxynitride film, a silicon nitride oxide film, or a silicon nitride film as the gate insulating film, silicon contained in the gate insulating film enters the oxide semiconductor film in some cases. When the oxide semiconductor film contains silicon, reductions in crystallinity and carrier mobility of the oxide semiconductor film occur, for example. Thus, it is preferable to provide the second layer between the first layer and the gate insulating film in order to reduce the concentration of silicon contained in the first layer where a channel is formed. For the same reason, it is preferable to provide a third layer which is formed using the constituent element of the first layer and has lower electron affinity than the first layer by 0.2 eV or more so that the first layer is interposed between the second layer and the third layer.

With such a structure, diffusion of an impurity such as silicon into a region where a channel is formed can be reduced and further prevented, so that a highly reliable transistor can be obtained.

Note that in order to make the oxide semiconductor film a CAAC-OS film, the concentration of silicon contained in the oxide semiconductor film is lower than or equal to $2.5 \times 10^{21}/cm^3$, preferably lower than $1.4 \times 10^{21}/cm^3$, more preferably lower than $4 \times 10^{19}/cm^3$, still more preferably lower than $2.0 \times 10^{18}/cm^3$. This is because when the concentration of silicon contained in the oxide semiconductor film is higher than or equal to $1.4 \times 10^{21}/cm^3$, the field-effect mobility of the transistor may be reduced, and when the concentration of silicon contained in the oxide semiconductor film is higher than or equal to $4.0 \times 10^{19}/cm^3$, the oxide semiconductor film may be made amorphous at an interface between the oxide semiconductor film and a film in contact with the oxide semiconductor film. Further, when the concentration of silicon contained in the oxide semiconductor film is lower than $2.0 \times 10^{18}/cm^3$, further improvement in reliability of the transistor and a reduction in density of state (DOS) of the oxide semiconductor film can be expected. Note that the concentration of silicon in the oxide semiconductor film can be measured by secondary ion mass spectroscopy (SIMS).

This embodiment can be combined with any of the other embodiments disclosed in this specification as appropriate.

Embodiment 4

In this embodiment, examples of electronic devices each including a display device with a touch sensor in one embodiment of the present invention will be described with reference to FIGS. 9A to 9F.

Figure 9A:
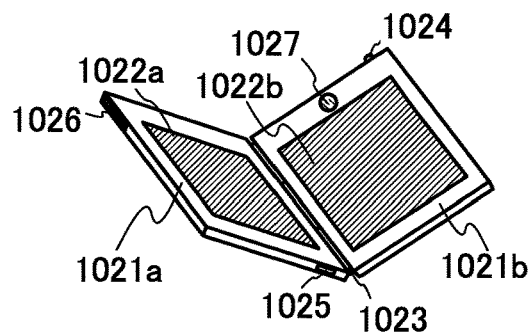
FIGS. 9A to 9F each illustrate an electronic device to which a display device of one embodiment of the present invention is applied.

An electronic device illustrated in FIG. 9A is an example of a foldable information terminal.

The electronic device illustrated in FIG. 9A has a housing 1021a provided with a panel 1022a, a housing 1021b provided with a panel 1022b, a hinge 1023, a button 1024, a connection terminal 1025, a recording media inserting portion 1026, and a speaker 1027.

The housing 1021a and the housing 1021b are connected by the hinge 1023.

Since the electronic device in FIG. 9A includes the hinge 1023, it can be folded so that the panels 1022a and 1022b face each other.

The button 1024 is provided for the housing 1021b. Note that the housing 1021a may also be provided with the button 1024. For example, when the button 1024 which functions as a power button is provided and pushed, supply of a power voltage to the electronic device can be controlled.

The connection terminal 1025 is provided for the housing 1021a. Note that the connection terminal 1025 may be provided on the housing 1021b. Alternatively, a plurality of connection terminals 1025 may be provided on one or both of the housings 1021a and 1021b. The connection terminal 1025 is a terminal for connecting the electronic device illustrated in FIG. 9A to another device.

The recording media inserting portion 1026 is provided for the housing 1021a. The recording media inserting portion 1026 may be provided on the housing 1021b. Alternatively, a plurality of recording media insertion portions 1026 may be provided on one or both of the housings 1021a and 1021b. For example, a card-type recording medium is inserted into the recording media inserting portion so that data can be read to the electronic device from the card-type recording medium or data stored in the electronic device can be written to the card-type recording medium.

The speaker 1027 is provided on the housing 1021b. The speaker 1027 outputs sound. Note that the speaker 1027 may be provided for the housing 1021a.

Note that the housing 1021a or the housing 1021b may be provided with a microphone, in which case the electronic device in FIG. 9A can function as a telephone, for example.

The electronic device illustrated in FIG. 9A functions as at least one of a telephone, an e-book reader, a personal computer, and a game machine, for example.

In the panels 1022a and/or the panel 1022b, the display device with a touch sensor in one embodiment of the present invention can be used.

Figure 9B:
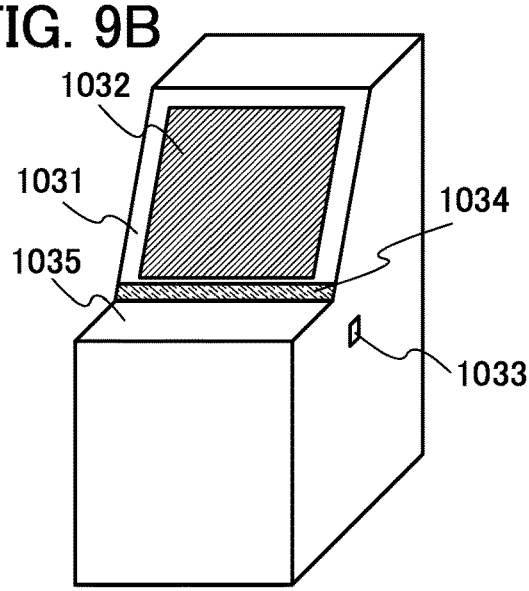

An electronic device illustrated in FIG. 9B is an example of a stationary information terminal. The electronic device illustrated in FIG. 9B has a housing 1031 which is provided with a panel 1032, a button 1033, and a speaker 1034.

Note that a panel similar to the panel 1032 may be provided for a deck portion 1035 of the housing 1031.

Further, the housing 1031 may be provided with a ticket slot for issuing a ticket or the like, a coin slot, a bill slot, and/or the like.

The button 1033 is provided for the housing 1031. For example, when the button 1033 is a power button, supply of a power voltage to the electronic device can be controlled by pressing the button 1033.

The speaker 1034 is provided for the housing 1031. The speaker 1034 outputs sound.

The electronic device in FIG. 9B serves as an automated teller machine, an information communication terminal (also referred to as multimedia station) for ordering a ticket or the like, or a game machine, for example.

In the panel 1032, the display device with a touch sensor in one embodiment of the present invention can be used.

Figure 9C:
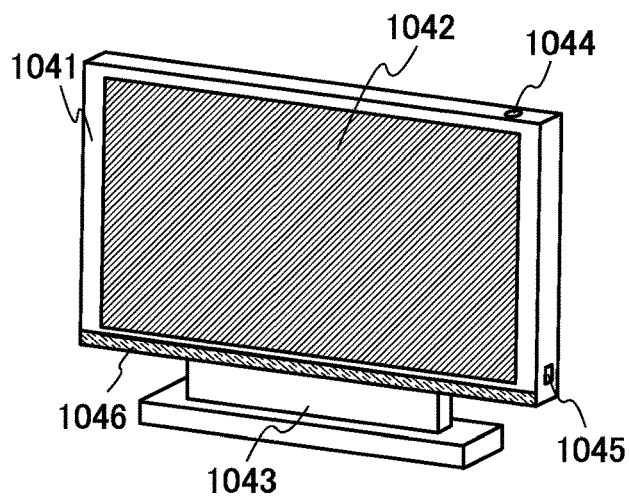

FIG. 9C illustrates an example of a stationary information terminal. The electronic device in FIG. 9C has a housing 1041 provided with a panel 1042, a support 1043 for supporting the housing 1041, a button 1044, a connection terminal 1045, and a speaker 1046.

Note that besides the connection terminal 1045, the housing 1041 may be provided with another connection terminal for connecting the electronic device to an external device.

The button 1044 is provided for the housing 1041. For example, when the button 1044 is a power button, supply of a power voltage to the electronic device can be controlled by pressing the button 1044.

The connection terminal 1045 is provided for the housing 1041. The connection terminal 1045 is a terminal for connecting the electronic device in FIG. 9C to another device. For example, when the electronic device in FIG. 9C and a personal computer are connected with the connection terminal 1045, the panel 1042 can display an image corresponding to a data signal input from the personal computer. For example, when the panel 1042 of the electronic device in FIG. 9C is larger than a panel of another electronic device connected thereto, a displayed image of the other electronic device can be enlarged, so that a plurality of viewers can easily see the image at the same time.

The speaker 1046 is provided on the housing 1041. The speaker 1046 outputs sound.

The electronic device in FIG. 9C functions as at least one of an output monitor, a personal computer, and a television set, for example.

In the panel 1042, the display device with a touch sensor in one embodiment of the present invention can be used.

Figure 9D:
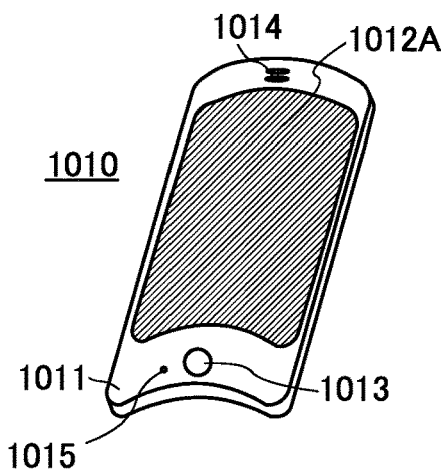
Figure 9E:
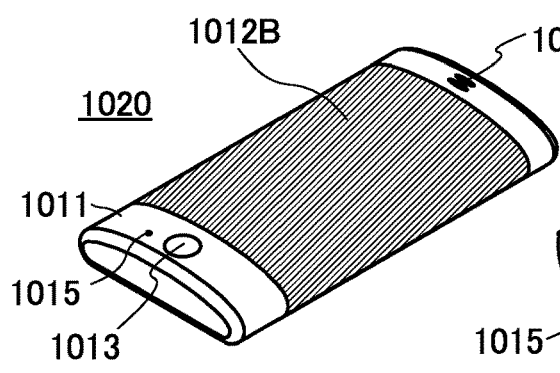
Figure 9F:
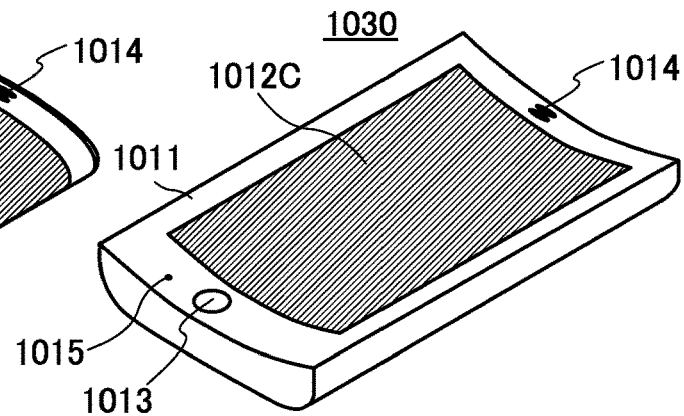

Each of electronic devices illustrated in FIGS. 9D to 9F is an example of a portable information terminal.

A portable information terminal 1010 illustrated in FIG. 9D includes an operation button 1013, a speaker 1014, a microphone 1015, an external connection port such as a stereo headphone jack, a memory card insertion slot, a camera, or a USB connector, and the like, in addition to a panel 1012A incorporated in a housing 1011.

In the panel 1012A, the display device with a touch sensor which is one embodiment of the present invention can be used. When a substrate having a curved surface is used as a support substrate of the touch sensor and a display element, a portable information terminal including a panel with a curved surface can be obtained. The panel 1012A is an example of a panel having a convex-curved surface.

A portable information terminal 1020 illustrated in FIG. 9E has the same structure as the portable information terminal 1010 and is an example of a portable information terminal including a panel 1012B which is curved along a side surface of a housing 1011. A portable information terminal 1030 illustrated in FIG. 9F has the same structure as the portable information terminal 1010 and is an example of a portable information terminal including a concave-curved panel 1012C.

The portable information terminals illustrated in FIGS. 9D to 9F each have a function of one or more of a telephone set, an e-book reader, a personal computer, and a game machine.

The above is the description of the electronic devices illustrated in FIGS. 9A to 9F.

As described with reference to FIGS. 9A to 9F, the display device with a touch sensor in one embodiment of the present invention is used in the panel of each electronic device in this embodiment. Thus, the weight, size, and thickness of the electronic device can be decreased.

The display device in one embodiment of the present invention can also have flexibility because of its very small total thickness. Accordingly, the electronic device can also include a panel having a curved surface or a panel which can be curved.

This embodiment can be combined with any of the other embodiments disclosed in this specification as appropriate.

This application is based on Japanese Patent Application serial no. 2012-192826 filed with Japan Patent Office on Sep. 3, 2012, the entire contents of which are hereby incorporated by reference.

What is claimed is:

1. A method for manufacturing a display device comprising:
a first step of stacking a separation layer, a layer to be separated, and a sensor layer in this order over a support substrate;
a second step of separating a stacked body including the layer to be separated and the sensor layer from the support substrate, the separating is caused at an interface between the separation layer and the layer to be separated;
a third step of sealing a display element between a first surface of a first substrate and a second substrate with a sealant, the first surface provided with a color filter;
a fourth step of providing the stacked body over and in contact with a second surface of the first substrate which is opposite to the first surface, with a first bonding layer interposed between the stacked body and the second surface after the third step;
a fifth step of providing a first transistor and a second transistor over the second substrate,
wherein the method further comprising a step of providing a polarizing plate over the sensor layer with a second bonding layer interposed between the polarizing plate and the sensor layer, after the fourth step,
wherein a first electrode of the sensor layer extends beyond the first substrate, and
wherein the second transistor is electrically connected to the display element overlapping with the first electrode and a second electrode of the sensor layer,
wherein an electrode of the first transistor extends beyond an end portion of the first substrate, and
wherein the electrode is electrically connected to an FPC (flexible printed circuit).

2. The method for manufacturing the display device according to claim 1, further comprising a step of pressure bonding of the FPC which is electrically connected to the electrode of the first transistor, after the fourth step.

3. The method for manufacturing the display device according to claim 1, wherein the separation layer is a metal layer.

4. The method for manufacturing the display device according to claim 1, wherein the layer to be separated is an oxide layer or a resin layer.

5. The method for manufacturing the display device according to claim 1,
wherein the first substrate is further provided with one of a black matrix, a spacer, an electrode of a liquid crystal element, an overcoat of a liquid crystal element, and an alignment film of a liquid crystal element.

6. A method for manufacturing a display device comprising:
stacking a separation layer, a layer to be separated, and a sensor layer in this order over a support substrate;
separating a stacked body including the layer to be separated and the sensor layer from the support substrate, the separating is caused at an interface between the separation layer and the layer to be separated;

sealing a display element between a first surface of a first substrate and a second substrate with a sealant, the first surface provided with a color filter; and providing the stacked body in contact with a second surface of the first substrate which is opposite to the first surface, with a first bonding layer interposed between the stacked body and the second surface after the sealing step, wherein a first electrode of the sensor layer extends beyond the first substrate, and providing a polarizing plate over the sensor layer with a second bonding layer interposed therebetween, after the step of providing the stacked body in contact with the second surface of the first substrate, wherein the sealant overlaps with end portions of the second bonding layer and the polarizing plate.

7. The method for manufacturing the display device according to claim 6, wherein the second substrate is shorter than the first substrate, and wherein a transistor is electrically connected to a dispay element overlapping with the first electrode and a second electrode of the sensor layer.

8. The method for manufacturing the display device according to claim 6, further comprising a step of pressure bonding of an FPC which is electrically connected to the sensor layer, after the step of providing the stacked body in contact with the second surface of the first substrate.

9. The method for manufacturing the display device according to claim 6, wherein the separation layer is a metal layer.

10. The method for manufacturing the display device according to claim 6, wherein the layer to be separated is an oxide layer or a resin layer.

11. The method for manufacturing the display device according to claim 6, wherein the first substrate is further provided with one of a black matrix, a spacer, an electrode of a liquid crystal element, an overcoat of a liquid crystal element, and an alignment film of a liquid crystal element.

12. A method for manufacturing a display device comprising:

stacking a separation layer, a layer to be separated, and a sensor layer in this order over a support substrate;

separating a stacked body including the layer to be separated and the sensor layer from the support substrate, the separating is caused at an interface between the separation layer and the layer to be separated;

sealing an organic EL element between a first surface of a first substrate and a second substrate with a sealant, the first surface provided with an auxiliary wiring to which one electrode of the organic EL element is electrically connected; and providing the stacked body in contact with a second surface of the first substrate which is opposite to the first surface, with a first bonding layer interposed between the stacked body and the second surface of the first substrate after the sealing step, wherein the sensor layer is formed through the following steps:

forming a first electrode and a second electrode with light-transmitting properties;

forming an insulating layer over the first electrode and the second electrode; and forming a wiring in contact with the first electrode and over the insulating layer.

13. The method for manufacturing the display device according to claim 12, further comprising a step of providing a polarizing plate over the sensor layer with a second bonding layer interposed therebetween, after the step of providing the stacked body in contact with the second surface of the first substrate, wherein the first electrode of the sensor layer extends beyond the first substrate.

14. The method for manufacturing the display device according to claim 12, further comprising a step of pressure bonding of an FPC which is electrically connected to the sensor layer, after the step of providing the stacked body in contact with the second surface of the first substrate.

15. The method for manufacturing the display device according to claim 12, wherein the separation layer is a metal layer.

16. The method for manufacturing the display device according to claim 12, wherein the layer to be separated is an oxide layer or a resin layer.

17. The method for manufacturing the display device according to claim 12, wherein the first substrate is further provided with a black matrix or a spacer.

* * * * *